United States Patent
Zhang et al.

(10) Patent No.: US 12,328,725 B2
(45) Date of Patent: Jun. 10, 2025

(54) SIDELINK CONTROL INFORMATION SENDING METHOD AND DEVICE

(71) Applicant: Huawei Technologies Co., Ltd., Shenzhen (CN)

(72) Inventors: Xingwei Zhang, Lund (SE); Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/511,217

(22) Filed: Oct. 26, 2021

(65) Prior Publication Data

US 2022/0070851 A1 Mar. 3, 2022

Related U.S. Application Data

(63) Continuation of application No. PCT/CN2020/086779, filed on Apr. 24, 2020.

(30) Foreign Application Priority Data

Apr. 26, 2019 (CN) .......................... 201910346067.3

(51) Int. Cl.
*H04W 72/20* (2023.01)
(52) U.S. Cl.
CPC .................................. *H04W 72/20* (2023.01)
(58) Field of Classification Search
CPC .................................................... H04W 72/20
See application file for complete search history.

(56) References Cited

U.S. PATENT DOCUMENTS

2016/0073408 A1   3/2016   Sartori et al.
2017/0048905 A1   2/2017   Yun et al.
(Continued)

FOREIGN PATENT DOCUMENTS

CN   106470384 A   3/2017
CN   106797635 A   5/2017
(Continued)

OTHER PUBLICATIONS

"On 2-stage PSCCH-I design," 3GPP TSG-RAN WG1 Meeting #94bis, Chengdu, China, Tdoc R1-1811607, Total 5 pages, 3rd Generation Partnership Project, Valbonne, France (Oct. 8-12, 2018).
(Continued)

*Primary Examiner* — Blake J Rubin
(74) *Attorney, Agent, or Firm* — Leydig, Voit & Mayer, Ltd.

(57) ABSTRACT

Embodiments of this application relate to the field of wireless communication, and provide a sidelink control information sending method and a device. After obtaining first information, a second terminal device may send sidelink control information to a first terminal device based on the first information, where the first information includes indication information indicating a type of the sidelink control information or includes characteristic information. The first terminal device may determine the type of the sidelink control information based on the first information, and further may blindly detect only a type of sidelink control information that the first terminal device needs to detect. This reduces complexity of blindly detecting the sidelink control information by the first terminal device.

18 Claims, 9 Drawing Sheets

(56) References Cited

U.S. PATENT DOCUMENTS

| | | | |
|---|---|---|---|
| 2018/0014345 A1* | 1/2018 | Sartori | H04W 76/14 |
| 2019/0173612 A1* | 6/2019 | Kimura | H04L 1/0063 |
| 2019/0174530 A1* | 6/2019 | Kim | H04W 72/12 |
| 2019/0229964 A1* | 7/2019 | Ouchi | H04L 5/0051 |
| 2019/0254091 A1* | 8/2019 | Kim | H04L 5/0078 |
| 2019/0306923 A1* | 10/2019 | Xiong | H04J 13/0062 |
| 2019/0356451 A1* | 11/2019 | Zhang | H04L 5/0032 |
| 2019/0387377 A1* | 12/2019 | Zhang | H04W 52/383 |
| 2020/0022089 A1* | 1/2020 | Guo | H04W 52/26 |
| 2020/0037343 A1* | 1/2020 | He | H04W 28/0268 |
| 2020/0053675 A1* | 2/2020 | Khoryaev | H04L 5/001 |
| 2020/0107236 A1* | 4/2020 | Tseng | H04W 4/50 |
| 2020/0145975 A1* | 5/2020 | Zhang | H04W 72/044 |
| 2020/0163103 A1* | 5/2020 | Kuang | H04W 72/23 |
| 2020/0205165 A1* | 6/2020 | Huang | H04L 1/1854 |
| 2020/0205171 A1* | 6/2020 | Jiang | H04W 4/40 |
| 2020/0229192 A1* | 7/2020 | Novlan | H04W 72/23 |
| 2020/0229198 A1* | 7/2020 | Kung | H04W 72/54 |
| 2020/0235887 A1* | 7/2020 | Hou | H04W 4/40 |
| 2020/0275425 A1* | 8/2020 | Cao | H04L 1/0003 |
| 2020/0288435 A1* | 9/2020 | Kwak | H04L 1/0079 |
| 2020/0305126 A1* | 9/2020 | Li | H04L 1/1614 |
| 2021/0120617 A1* | 4/2021 | Lee | H04W 72/20 |
| 2021/0160014 A1* | 5/2021 | Selvanesan | H04W 76/27 |
| 2021/0266921 A1* | 8/2021 | Wang | H04B 17/318 |
| 2021/0306106 A1* | 9/2021 | Park | H04L 1/1854 |
| 2021/0352599 A1* | 11/2021 | Kusashima | H04W 76/14 |
| 2021/0377893 A1* | 12/2021 | Khoryaev | H04L 5/0048 |
| 2021/0400448 A1* | 12/2021 | Adjakple | H04W 4/40 |
| 2022/0046593 A1* | 2/2022 | Stanczak | H04W 72/02 |
| 2022/0046598 A1* | 2/2022 | Zhao | H04W 48/12 |
| 2022/0070879 A1* | 3/2022 | Ryu | H04W 72/20 |
| 2022/0070881 A1* | 3/2022 | Wang | H04W 8/005 |
| 2022/0085921 A1* | 3/2022 | Zhang | H04L 1/1854 |
| 2022/0150730 A1* | 5/2022 | Freda | H04L 1/188 |
| 2022/0159674 A1* | 5/2022 | Deng | H04W 72/566 |
| 2022/0174655 A1* | 6/2022 | Tsai | H04W 72/20 |
| 2022/0201710 A1* | 6/2022 | Luo | H04W 72/1263 |

FOREIGN PATENT DOCUMENTS

| | | | |
|---|---|---|---|
| CN | 107615844 A | 1/2018 | |
| CN | 108923894 A | 11/2018 | |
| CN | 109196888 A | 1/2019 | |
| CN | 110896345 A | 3/2020 | |
| CN | 110999357 A | 4/2020 | |
| WO | 2019028847 A1 | 2/2019 | |
| WO | WO-2019240550 A1 * | 12/2019 | H04W 28/0268 |

OTHER PUBLICATIONS

"On 2-stage PSCCH design," 3GPP TSG-RAN WG1 Meeting #95, Spokane, WA, US, R1-1813648 (Revision of R1-181607), Total 4 pages, 3rd Generation Partnership Project, Valbonne, France (Nov. 12-16, 2018).

"PHY layer structure for NR sidelink," 3GPP TSG-RAN WG1 Meeting #96bis, Xi'an, China, R1-1905475, pp. 1-9, 3rd Generation Partnership Project, Valbonne, France (Apr. 8-12, 2019).

* cited by examiner

SIDELINK CONTROL INFORMATION SENDING METHOD AND DEVICE

CROSS-REFERENCE TO RELATED APPLICATIONS

This application is a continuation of International Application No. PCT/CN2020/086779, filed on Apr. 24, 2020, which claims priority to Chinese Patent Application No. 201910346067.3, filed on Apr. 26, 2019. The disclosures of the aforementioned applications are hereby incorporated by reference in their entireties.

TECHNICAL FIELD

This application relates to the wireless communication field, and in particular, to a sidelink control information sending method and a device.

BACKGROUND

In Rel-14, Rel-15, and Rel-16 of the 3rd Generation Partnership Project, vehicle-to-everything (V2X) is proposed as a major application of a device to device (D2D) technology. V2X is dedicated to sidelink communication. A sidelink is a communication link for direct communication between a sending terminal and a receiving terminal.

In a V2X communication system, the sending terminal and the receiving terminal communicate with each other according to a scheduling assignment (SA)+data mechanism. For example, before the sending terminal sends data to the receiving terminal, the sending terminal first sends SA to the receiving terminal, where the SA may be used to indicate status information of data that is sent by the sending terminal, the SA includes sidelink control information, and the sidelink control information includes time-frequency resource information of the data, a modulation and coding scheme (MCS), and the like. After receiving the SA, the receiving terminal can receive, based on content included in the sidelink control information, the data that is sent by the sending terminal.

There may be one or more types of sidelink control information. For example, with the development of technologies, in a next generation network (for example, a new radio (NR) network), in addition to a previously-used one-level structure of sidelink control information in a long term evolution (LTE) network, a two/more-level structure of sidelink control information may be introduced. For example, assuming that the receiving terminal supports multiple types of sidelink control information (e.g., the one-level structure of sidelink control information and a two-level structure of sidelink control information), but the receiving terminal does not know a specific type of sidelink control information that the receiving terminal needs to receive, the receiving terminal needs to blindly detect sidelink control information in a position in which all types of sidelink control information may possibly be sent. Consequently, complexity of blind detection is high.

SUMMARY

Embodiments of this application provide a sidelink control information sending method and a device. A receiving terminal may determine a type of sidelink control information received by the receiving terminal, and further may blindly detect sidelink control information of only a type of sidelink control information that the receiving terminal needs to detect, to reduce complexity of blindly detecting the sidelink control information by the receiving terminal.

To achieve the foregoing objective, the following technical solutions are used in the embodiments of this application.

According to a first aspect, an embodiment of this application provides a sidelink control information sending method. The method includes: a first terminal device receives sidelink control information sent by a second terminal device; and the first terminal device determines a type of the sidelink control information based on first information.

According to the technical solution provided in the first aspect, the first terminal device may first determine the type of the sidelink control information based on the first information, and further may blindly detect only a type of sidelink control information that the first terminal device needs to detect. This reduces complexity of blindly detecting the sidelink control information by the first terminal device.

With reference to the first aspect, in a first possible implementation, the first terminal device receives the first information sent by a network device or the second terminal device, where the first information includes indication information indicating the type of the sidelink control information. According to this solution, the first terminal device may determine the type of the sidelink control information based on the indication information sent by the second terminal device or the network device, and further may blindly detect only a type of sidelink control information that the first terminal device needs to detect. This reduces complexity of blindly detecting the sidelink control information by the first terminal device.

With reference to the first possible implementation of the first aspect, in a second possible implementation, the first information is radio resource control signaling, media access control signaling, a master information block, a system information block, or physical control information, where the physical control information includes previous sidelink control information or downlink control information. According to this solution, the first terminal device may determine the type of the sidelink control information based on the indication information included in the following information sent by the second terminal device: the radio resource control signaling, the media access control signaling, the master information block, the system information block, or the previous sidelink control information. Further, the first terminal device may need to blindly detect only the type of the sidelink control information that the first terminal device needs to detect, and therefore complexity of blindly detecting the sidelink control information by the first terminal device is reduced. Alternatively, the first terminal device may determine the type of the sidelink control information based on the indication information included in the following information sent by the network device: the radio resource control signaling, the media access control signaling, the master information block, the system information block, or the downlink control information. Further, the first terminal device may need to blindly detect only the type of the sidelink control information that the first terminal device needs to detect, and therefore complexity of blindly detecting the sidelink control information by the first terminal device is reduced.

With reference to the first aspect, in a third possible implementation, the first information includes characteristic information. That the first terminal device determines a type of the sidelink control information based on the first information includes: the first terminal device determines the type of the sidelink control information based on the characteristic information and an association relationship between the characteristic information and the type of the sidelink control information. According to this solution, the first terminal device may determine the type of the sidelink control information based on the characteristic information and the association relationship between the characteristic information and the type of the sidelink control information, and further may blindly detect only the type of the sidelink control information that the first terminal device needs to detect. This reduces complexity of blindly detecting the sidelink control information by the first terminal device.

With reference to the third possible implementation of the first aspect, in a fourth possible implementation, the characteristic information includes at least one of the following information: radio network temporary identifier information, search space information, and transmission resource information. According to this solution, the first terminal device may determine the sidelink control information based on at least one of the following information combinations: the radio network temporary identifier information and an association relationship between the radio network temporary identifier information and the type of the sidelink control information; the search space information and an association relationship between the search space information and the type of the sidelink information; and the transmission resource information and an association relationship between the transmission resource information and the type of the sidelink control information. The first terminal device may further blindly detect the type of the sidelink control information that the first terminal device needs to detect. This reduces complexity of blindly detecting the sidelink control information by the first terminal device.

With reference to the third possible implementation and the fourth possible implementation of the first aspect, in a fifth possible implementation, the first terminal device receives first indication information sent by the second terminal device or the network device, where the first indication information is used to indicate a type of sidelink control information to-be-detected by the first terminal device. According to this solution, the first terminal device may change, based on the first indication information sent by the second terminal device or the network device, the type of the sidelink control information to-be-detected by the first terminal device or the network device.

With reference to any one of the first aspect or the possible implementations of the first aspect, in a sixth possible implementation, the first terminal device sends second indication information to the second terminal device or the network device, where the second indication information is used to indicate a type of sidelink control information supported by the first terminal device. According to this solution, the first terminal device may report, to the second terminal device or the network device, the type of the sidelink control information supported by the first terminal device.

With reference to any one of the first aspect or the possible implementations of the first aspect, in a seventh possible implementation, the type of the sidelink control information includes a two-level structure of sidelink control information, or the type of the sidelink control information includes a first level of sidelink control information of the two-level structure of the sidelink control information. According to this solution, the first terminal device may determine that the type of the sidelink control information is the two-level structure of sidelink control information or the first level of sidelink control information of the two-level structure of the sidelink control information.

With reference to any one of the first aspect or the possible implementations of the first aspect, in an eighth possible implementation, the sidelink control information includes resource indication information, and the resource indication information is used to indicate a resource of data and/or a resource of a second level of sidelink control information of the two-level structure of the sidelink control information. According to this solution, the sidelink control information received by the first terminal device may include the resource indication information, and the resource indication information is used to indicate the resource of the data and/or the resource of the second level of sidelink control information of the two-level structure of the sidelink control information.

According to a second aspect, an embodiment of this application provides a sidelink control information sending method. The method includes: a second terminal device obtains first information, where the first information is used to indicate a type of sidelink control information that is sent by the second terminal device to a first terminal device; and the second terminal device sends the sidelink control information to the first terminal device based on the first information.

According to the technical solution provided in the second aspect, after obtaining the first information, the second terminal device may send the sidelink control information to the first terminal device based on the first information. Therefore, the first terminal device may determine the type of the sidelink control information based on the first information, and further blindly detect only a type of sidelink control information that the first terminal device needs to detect. This reduces complexity of blindly detecting the sidelink control information by the first terminal device.

With reference to the second aspect, in a first possible implementation, the first information includes indication information indicating the type of the sidelink control information. The method further includes: the second terminal device sends the first information to the first terminal device. According to this solution, the second terminal device may send the indication information indicating the type of the sidelink control information to the first terminal device. The first terminal device may determine the type of the sidelink control information based on the indication information indicating the type of the sidelink control information, and further may blindly detect only a type of sidelink control information that the first terminal device needs to detect. This reduces complexity of blindly detecting the sidelink control information by the first terminal device.

With reference to the first possible implementation of the second aspect, in a second possible implementation, the first information is radio resource control signaling, media access control signaling, a master information block, a system information block, or previous sidelink control information. According to this solution, the second terminal device may send the indication information indicating the type of the sidelink control information to the first terminal device by using the radio resource control signaling, the media access control signaling, the master information block, the system information block, or the previous sidelink control information. The first terminal device may determine the type of the sidelink control information based on the indication information indicating the type of the sidelink control information, and further may blindly detect only a type of sidelink control information that the first terminal device needs to detect. This reduces complexity of blindly detecting the sidelink control information by the first terminal device.

With reference to the second aspect, in a third possible implementation, the first information includes characteristic information, and the characteristic information includes at least one of the following information: radio network temporary identifier information, search space information, and control resource information. According to this solution, after obtaining the characteristic information, the second terminal device may send the sidelink control information to the first terminal device based on the characteristic information. Therefore, the first terminal device may determine the type of the sidelink control information based on the characteristic information and an association relationship between the characteristic information and the sidelink control information, and further blindly detect only a type of sidelink control information that the first terminal device needs to detect. This reduces complexity of blindly detecting the sidelink control information by the first terminal device.

With reference to the third possible implementation of the second aspect, in a fourth possible implementation, the second terminal device sends first indication information sent to the first terminal device, where the first indication information is used to indicate a type of sidelink control information to-be-detected by the first terminal device. According to this solution, the second terminal device may send the first indication information to the first terminal device, to indicate the first terminal device to change the type of the sidelink control information to-be-detected by the first terminal device.

With reference to any one of the second aspect or the possible implementations of the second aspect, in a fifth possible implementation, the second terminal device receives second indication information sent by the first terminal device, where the second indication information is used to indicate a type of sidelink control information supported by the first terminal device. According to this solution, the second terminal device may receive the type of the sidelink control information supported by the first terminal device, where the type of the sidelink control information supported by the first terminal device is reported by the first terminal device, to send a type of sidelink control information supported by the second terminal device to the first terminal device.

With reference to any one of the second aspect or the possible implementations of the second aspect, in a sixth possible implementation, that a second terminal device obtains first information includes: the second terminal device receives the first information sent by a network device. Alternatively, that a second terminal device obtains first information includes: The second terminal device determines the type of the sidelink control information, and obtains the first information based on the type of the sidelink control information. According to this solution, the second terminal device may receive the first information sent by the network device or obtain the first information based on the type of the sidelink control information.

With reference to any one of the second aspect or the possible implementations of the second aspect, in a seventh possible implementation, the type of the sidelink control information includes a two-level structure of sidelink control information, or the type of the sidelink control information includes a first level of sidelink control information of the two-level structure of the sidelink control information. According to this solution, the type of the sidelink control information indicated by the first information obtained by the second terminal device may be the two-level structure of sidelink control information or the first level of sidelink control information of the two-level structure of the sidelink control information.

With reference to any one of the second aspect or the possible implementations of the second aspect, in an eighth possible implementation, the sidelink control information includes resource indication information, and the resource indication information is used to indicate a resource of data and/or a resource of a second level of sidelink control information of the two-level structure of the sidelink control information. According to this solution, the sidelink control information sent by the second terminal device may include the resource indication information, and the resource indication information is used to indicate the resource of the data and/or the resource of the second level of sidelink control information of the two-level structure of the sidelink control information.

According to a third aspect, an embodiment of this application provides a sidelink control information sending method. The method includes: a network device determines first information, where the first information is used to indicate a type of sidelink control information sent by a second terminal device to a first terminal device; and the network device sends the first information to the second terminal device or to the first terminal device and the second terminal device. According to this solution, the network device may indicate, to the second terminal device or to the first terminal device and the second terminal device by using the first information, the type of the sidelink control information that is sent by the second terminal device to the first terminal device. The first terminal device may determine the type of the sidelink control information based on the first information, and further may blindly detect only a type of sidelink control information that the first terminal device needs to detect. This reduces complexity of blindly detecting the sidelink control information by the first terminal device. The second terminal device may send the sidelink control information to the first terminal device based on the first information.

With reference to the third aspect, in a first possible implementation, the first information includes indication information indicating the type of the sidelink control information that is sent by the second terminal device to the first terminal device. According to this solution, the network device may send, to the second terminal device or to the first terminal device and the second terminal device, the indication information indicating the type of the sidelink control information, to indicate the type of the sidelink control information that is sent by the second terminal device to the first terminal device.

With reference to the third aspect or the possible implementation of the third aspect, in a second possible implementation, the first information is radio resource control signaling, media access control signaling, a master information block, a system information block, or downlink control information. According to this solution, the network device may indicate, to the second terminal device or to the first terminal device and the second terminal device by using the radio resource control signaling, the media access control signaling, the master information block, the system information block, or the downlink control information, the type of the sidelink control information that is sent by the second terminal device to the first terminal device.

With reference to any one of the third aspect or the possible implementations of the third aspect, in a third possible implementation, the network device sends first indication information to the first terminal device, where the first indication information is used to indicate a type of sidelink control information to-be-detected by the first terminal device. According to this solution, the network device may send the first indication information to the first terminal device, to indicate the first terminal device to change the type of the sidelink control information to-be-detected by the first terminal device.

With reference to any one of the third aspect or the possible implementations of the third aspect, in a fourth possible implementation, the network device receives second indication information sent by the first terminal device, where the second indication information is used to indicate a type of sidelink control information supported by the first terminal device. According to this solution, the network device may receive the type of the sidelink control information supported by the first terminal device, where the type of the sidelink control information supported by the first terminal device is reported by the first terminal device, to indicate the second terminal device to send a type of sidelink control information supported by the second terminal device to the first terminal device.

With reference to any one of the third aspect or the possible implementations of the third aspect, in a fifth possible implementation, the type of the sidelink control information includes a two-level structure of sidelink control information, or the type of the sidelink control information includes a first level of sidelink control information of the two-level structure of the sidelink control information. According to this solution, the type of the sidelink control information indicated by the first information determined by the network device may be the two-level structure of sidelink control information or the first level of sidelink control information of the two-level structure of the sidelink control information.

According to a fourth aspect, an embodiment of this application provides a sidelink control information sending method. The method includes: a first terminal device sends first indication information to a second terminal device or a network device, where the first indication information is used to indicate a type of sidelink control information supported by the first terminal device. According to this solution, the first terminal device may report, to the second terminal device or the network device, the type of the sidelink control information supported by the first terminal device.

With reference to the fourth aspect, in a first possible implementation, the first terminal device receives sidelink control information sent by the second terminal device, and the first terminal device determines the type of the sidelink control information based on the first information. According to this solution, the first terminal device may first determine the type of the sidelink control information based on the first information, and further may blindly detect only a type of sidelink control information that the first terminal device needs to detect. This reduces complexity of blindly detecting the sidelink control information by the first terminal device.

According to a fifth aspect, an embodiment of this application provides a terminal device. The terminal device has functions of implementing the method according to the first aspect. The functions may be implemented by hardware, or may be implemented by hardware executing corresponding software. The hardware or the software includes one or more modules corresponding to the functions.

According to a sixth aspect, an embodiment of this application provides a terminal device. The terminal device has functions of implementing the method according to the second aspect. The functions may be implemented by hardware, or may be implemented by hardware executing corresponding software. The hardware or the software includes one or more modules corresponding to the functions.

According to a seventh aspect, an embodiment of this application provides a network device. The network device has functions of implementing the method according to the third aspect. The functions may be implemented by hardware, or may be implemented by hardware executing corresponding software. The hardware or the software includes one or more modules corresponding to the functions.

According to an eighth aspect, an embodiment of this application provides a terminal device. The terminal device has functions of implementing the method according to the fourth aspect. The functions may be implemented by hardware, or may be implemented by hardware executing corresponding software. The hardware or the software includes one or more modules corresponding to the functions.

According to a ninth aspect, this application provides a communication apparatus. The communication apparatus may include at least one processor. Related program instructions are executed on the at least one processor, to implement functions of the terminal device in the method according to any one of the first aspect or the designs of the first aspect. Optionally, the communication apparatus may further include at least one memory, and the memory stores the related program instructions. The communication apparatus may be the terminal device in the method according to any one of the first aspect or the designs of the first aspect.

According to a tenth aspect, this application provides a communication apparatus. The communication apparatus may include at least one processor. Related program instructions are executed on the at least one processor, to implement functions of the terminal device in the method according to any one of the second aspect or the designs of the second aspect. Optionally, the communication apparatus may further include at least one memory, and the memory stores the related program instructions. The communication apparatus may be the terminal device in the method according to any one of the second aspect or the designs of the second aspect.

According to an eleventh aspect, this application provides a communication apparatus. The communication apparatus may include at least one processor. Related program instructions are executed on the at least one processor, to implement functions of the network device in the method according to any one of the third aspect or the designs of the third aspect. Optionally, the communication apparatus may further include at least one memory, and the memory stores the related program instructions. The communication apparatus may be the network device in the method according to any one of the third aspect or the designs of the third aspect.

According to a twelfth aspect, this application provides a communication apparatus. The communication apparatus may include at least one processor. Related program instructions are executed on the at least one processor, to implement functions of the terminal device in the method according to any one of the fourth aspect or the designs of the fourth aspect. Optionally, the communication apparatus may further include at least one memory, and the memory stores the related program instructions. The communication apparatus may be the terminal device in the method according to any one of the fourth aspect or the designs of the fourth aspect.

According to a thirteenth aspect, this application provides a system chip. The system chip may be used in a communication apparatus, and includes at least one processor.

Related program instructions are executed on the at least one processor, to implement functions of the terminal device in the method according to any one of the first aspect or the designs of the first aspect. Optionally, the system chip may further include at least one memory, and the memory stores the related program instructions.

According to a fourteenth aspect, this application provides a system chip. The system chip may be used in a communication apparatus, and includes at least one processor. Related program instructions are executed on the at least one processor, to implement functions of the terminal device in the method according to any one of the second aspect or the designs of the second aspect. Optionally, the system chip may further include at least one memory, and the memory stores the related program instructions.

According to a fifteenth aspect, this application provides a system chip. The system chip may be used in a communication apparatus, and includes at least one processor. Related program instructions are executed on the at least one processor, to implement functions of the network device in the method according to any one of the third aspect or the designs of the third aspect. Optionally, the system chip may further include at least one memory, and the memory stores the related program instructions.

According to a sixteenth aspect, this application provides a system chip. The system chip may be used in a communication apparatus, and includes at least one processor. Related program instructions are executed on the at least one processor, to implement functions of the terminal device in the method according to any one of the fourth aspect or the designs of the fourth aspect. Optionally, the system chip may further include at least one memory, and the memory stores the related program instructions.

According to a seventeenth aspect, this application provides a computer storage medium. The computer storage medium may be used in a communication apparatus, and stores program instructions. The related program instructions are run to implement functions of the terminal device in the method according to any one of the first aspect or the designs of the first aspect.

According to an eighteenth aspect, this application provides a computer storage medium. The computer storage medium may be used in a communication apparatus, and stores program instructions. The related program instructions are run to implement functions of the terminal device in the method according to any one of the second aspect or the designs of the second aspect.

According to a nineteenth aspect, this application provides a computer storage medium. The computer storage medium may be used in a communication apparatus, and stores program instructions. The related program instructions are run to implement functions of the network device in the method according to any one of the third aspect or the designs of the third aspect.

According to a twentieth aspect, this application provides a computer storage medium. The computer storage medium may be used in a communication apparatus, and stores program instructions. The related program instructions are run to implement functions of the terminal device in the method according to any one of the fourth aspect or the designs of the fourth aspect.

According to a twenty-first aspect, this application provides a computer program product. The computer program product includes program instructions. The related program instructions are executed to implement functions of the terminal device in the method according to any one of the first aspect or the designs of the first aspect.

According to a twenty-second aspect, this application provides a computer program product. The computer program product includes program instructions. The related program instructions are executed to implement functions of the terminal device in the method according to any one of the second aspect or the designs of the second aspect.

According to a twenty-third aspect, this application provides a computer program product. The computer program product includes program instructions. The related program instructions are executed to implement functions of the network device in the method according to any one of the third aspect or the designs of the third aspect.

According to a twenty-fourth aspect, this application provides a computer program product. The computer program product includes program instructions. The related program instructions are executed to implement functions of the terminal device in the method according to any one of the fourth aspect or the designs of the fourth aspect.

According to a twenty-fifth aspect, an embodiment of this application provides a communication system. The communication system may include any one or more of the following: the terminal device in the fifth aspect, the terminal device in the sixth aspect, the network device in the seventh aspect, the terminal device in the eighth aspect, the communication apparatus in the ninth aspect, the communication apparatus in the tenth aspect, the communication apparatus in the eleventh aspect, the communication apparatus in the twelfth aspect, the system chip in the thirteenth aspect, the system chip in the fourteenth aspect, the system chip in the fifteenth aspect, the system chip in the sixteenth aspect, the computer storage medium in the seventeenth aspect, the computer storage medium in the eighteenth aspect, the computer storage medium in the nineteenth aspect, the computer storage medium in the twentieth aspect, the computer program product in the twenty-first aspect, the computer program product in the twenty-second aspect, the computer program product in the twenty-third aspect, or the computer program product in the twenty-fourth aspect.

It can be understood that any apparatus, any system chip, any computer storage medium, or any computer program product provided above is configured to perform a corresponding method provided above. Therefore, for beneficial effects that can be achieved, refer to beneficial effects in the corresponding method. Details are not described herein again.

DESCRIPTION OF EMBODIMENTS

The following describes implementations of the embodiments of this application in detail with reference to the accompanying drawings.

The method provided in the embodiments of this application may be applied to any communication system supporting V2X communication. The communication system may be a 3rd Generation Partnership Project (3GPP) communication system, for example, an LTE system; or may be a 5th generation (5G) mobile communication system, an NR system, or a next-generation communication system; or may be a non-3GPP communication system. This is not limited. The following uses only a communication system 100 shown in FIG. 1 as an example to describe methods provided in the embodiments of this application.

Figure 1:
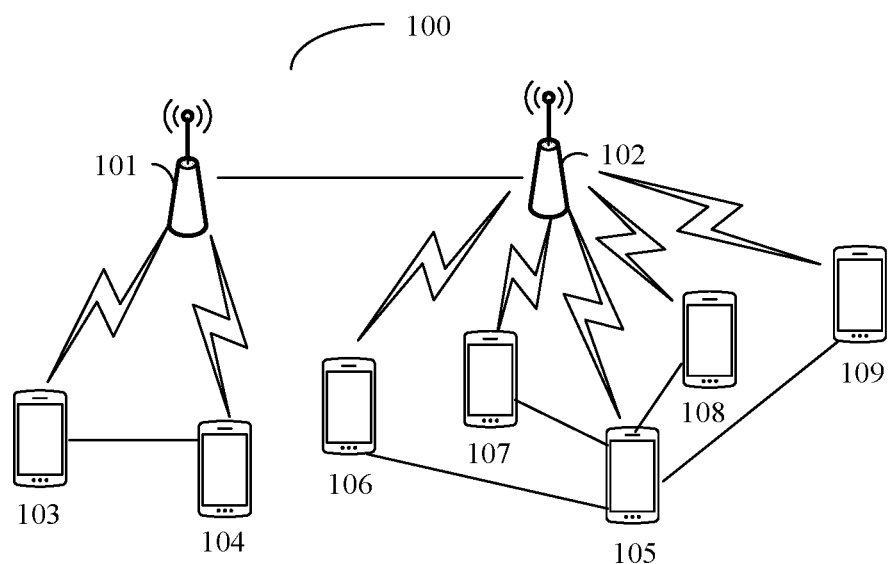
FIG. 1 is a schematic diagram of an architecture of a communication system, according to an embodiment of this application.

FIG. 1 is a schematic diagram of an architecture of the communication system 100, according to an embodiment of this application. In FIG. 1, the communication system 100 may include a plurality of network devices and a plurality of terminal devices. For example, the communication system 100 may include network devices 101 and 102 and terminal devices 103 to 109.

In FIG. 1, the network devices may provide wireless access services for the terminal devices. Specifically, each network device corresponds to one service coverage area, and a terminal device entering the area may communicate with the network device through a Uu interface, to receive a wireless access service provided by the network device. The terminal device and the network device may communicate with each other through a Uu interface link. The Uu interface link may be classified as an uplink (UL) and a downlink (DL) based on directions of data transmitted over the Uu interface link. The UL may be used to transmit data that is sent from the terminal device to the network device. The DL may be used to transmit data that is sent from the network device to the terminal device. For example, in FIG. 1, the terminal device 103 is located in a coverage area of the network device 101, the network device 101 may send data to the terminal device 103 through the DL, and the terminal device 103 may send data to the network device 101 through the UL.

The terminal device may communicate with another terminal device through a direct communication link. For example, the terminal device may perform unicast communication, broadcast communication, or multicast communication with another terminal device through a direct communication link. The direct communication link may be referred to as a side link or a sidelink (SL). For example, the direct communication link is a sidelink. In FIG. 1, the terminal device 103 may perform unicast communication with the terminal device 104 through a sidelink, and the terminal device 105 may perform multicast communication with the terminal devices 106 to 109 through a sidelink.

The network device in FIG. 1, for example, the network device 101 or 102, may be a transmission reception point (TRP), a base station, a relay station, or an access point. The network device 101 or 102 may be a network device in a 5G communication system, a network device in a future evolved network, a base transceiver station (BTS) in a global system for mobile communications (GSM) or a code division multiple access (CDMA) network, a NodeB in wideband code division multiple access (WCDMA), or an evolved NodeB (eNB or eNodeB) in long term evolution (LTE). The network device 101 or 102 may alternatively be a radio controller in a cloud radio access network (CRAN) scenario.

The terminal devices in FIG. 1, for example, the terminal devices 103 to 109, may be devices that have a wireless transceiver function and can provide communication services for users. Specifically, the terminal devices 103 to 109 may be devices in a V2X system, devices in a D2D system, devices in a machine type communication (MTC) system, or the like. For example, the terminal devices 103 to 109 may be industrial robots, industrial automatic devices, user equipment (UE), access terminals, subscriber units, subscriber stations, mobile stations, remote stations, remote terminals, mobile devices, user terminals, terminals, wireless communication devices, user agents, or user apparatuses. For example, the terminal devices 103 to 109 may be cellular phones, cordless phones, session initiation protocol (SIP) phones, wireless local loop (WLL) stations, personal digital assistants (PDAs), handheld devices with a wireless communication function, computing devices or other processing devices connected to wireless modems, vehicle-mounted devices, wearable devices, terminal devices in a 5G network or a network higher than the 5G network, or terminal devices in a future evolved network. This is not limited in the embodiments of this application.

It should be noted that, the communication system 100 shown in FIG. 1 is merely an example for description, and should not constitute any limitation on the technical solutions of this application. A person skilled in the art should understand that the communication system 100 may further include other devices in a specific implementation process. In addition, a quantity of network devices and a quantity of terminal devices may be determined depending on specific requirements. In addition, the network elements in FIG. 1 may alternatively be connected through other interfaces. This is not limited.

In the communication system shown in FIG. 1, for example, the terminal device 103 performs sidelink communication with the terminal device 104. When the terminal device 103 needs to send data to the terminal device 104, the terminal device 103 may first send sidelink control information (SCI) to the terminal device 104, where the sidelink control information carries related information (for example, a time-frequency resource) about the data. The terminal device 104 does not know whether the terminal device 103 sends the sidelink control information, and does not know a specific resource on which the terminal device 103 sends the sidelink control information, either. Therefore, the terminal device 104 needs to blindly detect sidelink control information sent by the terminal device 103 in all possible positions in which the sidelink control information is possibly sent. If the sidelink control information is correctly received and an identifier included in the sidelink control information matches an identifier of the terminal device 104, the terminal device 104 may receive the data based on related information about the data carried in the sidelink control information.

In the embodiments of this application, sidelink control information may include multiple types of control information. Based on different control information included in the sidelink control information, the sidelink control information may include SCI for scheduling data, or may include sidelink feedback control information (SFCI) for feeding back a hybrid automatic repeat request (HARQ) or channel state information (CSI), and the like. This is not limited. The following embodiments of this application uses SCI as an example for description. For a method for sending other control information, refer to SCI sending methods in the following embodiments.

There may be multiple types of sidelink control information, for example, a one-level structure of sidelink control information, a two-level structure of sidelink control information, and another structure of sidelink control information, for example, a multi-level (e.g., more than two levels) structure of sidelink control information. This is not limited. The embodiments of this application are described only by using an example of the one-level structure of sidelink control information and the two-level structure of sidelink control information. For a method for sending the multi-level (e.g., more than two levels) structure of sidelink control information, refer to the embodiments of this application. Details are not described herein again.

The one-level structure of the sidelink control information (SCI 1) may be sidelink control information for which data scheduling information can be obtained by demodulating only one physical sidelink control channel (PSCCH). For example, the SCI 1 may be sidelink control information that has a same structure as sidelink control information that is sent by a sending terminal to a receiving terminal in an LTE network.

The two-level structure of the sidelink control information (SCI 2) may be sidelink control information for which data scheduling information can be obtained by demodulating two PSCCHs. The two-level structure of the sidelink control information may include a first level of sidelink control information of the two-level structure of the sidelink control information (SCI 2-1) and a second level of sidelink control information of the two-level structure of the sidelink control information (SCI 2-2).

The SCI 2 may be of multiple structures. For example, for a structure of SCI 2, SCI 2-1 may be used to schedule SCI 2-2, and the SCI 2-2 may be used to schedule data. For another example, for another structure of SCI 2, SCI 2-1 may be used to schedule SCI 2-2 and data, and the SCI 2-2 is used to indicate a transmission parameter of a PSSCH or is used to schedule a physical sidelink feedback channel (PSFCH). For this structure of the SCI 2, the SCI 2-1 may include at least one of the following information: delay-sensitive information, common information, information occupied for listening to resources by another terminal, a broadcast message whose receiving terminal is not limited, and the like. The SCI 2-2 may include at least one of the following information: information dedicated to a receiving terminal, a unicast message, a multicast message, and the like. A terminal device in a listening state or a terminal device that needs to receive common information may subsequently receive only the first level of the sidelink control information of the two-level structure of the sidelink control information, and does not need to receive the second level of the sidelink control information of the two-level structure of the sidelink control information.

Optionally, types of sidelink control information that need to be determined in the embodiments of this application may include the one-level structure of the sidelink control information (SCI 1) and the two-level structure of the sidelink control information (SCI 2).

Optionally, types of sidelink control information that need to be determined in the embodiments of this application may alternatively include the one-level structure of the sidelink control information (SCI 1) and the first level of the sidelink control information of the two-level structure of the sidelink control information (SCI 2-1).

Optionally, the SCI 1 and the SCI 2 are two control signaling formats. For example, the SCI 1 is a control signaling format 1, and the SCI 2 is a control signaling format 2.

Optionally, the SCI 1 and the SCI 2-1 need to be obtained by a first terminal device in a blind detection manner, and the second level of the SCI (SCI 2-2) of the two-level structure of the SCI is indicated by the SCI 2-1 instead of being obtained by the first terminal device in a blind detection manner.

Optionally, the SCI 1 and the SCI 2-1 have a same length or different lengths.

Optionally, the SCI includes resource indication information, and the resource indication information is used to indicate a resource of data and/or a resource of the SCI 2-2.

For example, the SCI 1 is used to schedule a resource of a physical sidelink shared channel (PSSCH), the SCI 2-1 is used to schedule the SCI 2-2 and/or a resource of the PSSCH, and the SCI 2-2 is used to schedule the resource of the PSSCH. Alternatively, if the SCI 2-1 includes a resource of a PSSCH, the SCI 2-2 is used to indicate a transmission parameter of the PSSCH or is used to schedule a PSFCH.

For example, the SCI 1 or the SCI 2-1 may include only one frequency-domain resource allocation field and/or one time-domain resource allocation field. For example, if a second terminal determines that a type of SCI is the SCI 1, the frequency-domain resource allocation field and/or the time-domain resource allocation field indicate/indicates resources allocated to the PSSCH. If the second terminal device determines that a type of SCI is the SCI 2 or the SCI 2-1, the frequency-domain resource allocation field and/or the time-domain resource allocation field indicate/indicates resources allocated to a PSCCH carrying the SCI 2-2 or a PSSCH carrying data.

For example, the SCI 2-1 may include two frequency-domain resource allocation fields and/or two time-domain resource allocation fields, where one frequency-domain resource allocation field and/or one time-domain resource allocation field indicate/indicates resources or a resource allocated to a PSCCH carrying the SCI 2-2, and the other frequency-domain resource allocation field and/or another time-domain resource allocation field indicate/indicates resources or a resource allocated to a PSSCH carrying data. Specifically, the resource carrying the PSCCH of the SCI 2-2 and the resource carrying the PSSCH of the data may be arranged in a sequence in which the resource of the PSCCH comes before the resource of the PSSCH, or the resource carrying the PSCCH of the SCI 2-2 and the resource carrying the PSSCH of the data may be arranged in a sequence in which the resource of the PSSCH comes before the resource of the PSCCH, to reduce bit overheads. In the SCI 2-1, a resource on a specific channel that comes first may be indicated by using one bit, to increase flexibility.

Resources may include at least one of the following resources: a time-domain resource, a frequency-domain resource, a code-domain resource, a space-domain resource, and a power-domain resource. The transmission parameter may include at least one of the following information: frequency hopping information, resource block (RB) scheduling information, transmission reception point (TRP) information, MCS information, timing advance (TA) information, and a destination identifier (ID). The time-domain resource may include at least one of the following information: a symbol position (for example, a start symbol position and an end symbol position), a quantity of symbols, and slot positions (for example, a start slot position and an end slot position), and a quantity of slots. The frequency-domain resource may include at least one of the following information: an index of an RB, a quantity of RBs, an index of a subchannel, and an identifier of an RB on the subchannel. The code-domain resource may include at least one of the following information: a root sequence, a mask, a scrambling code, a cyclic shift, and a comb. The space-domain resource may include at least one of the following information: a codeword, a stream, a layer, a quantity of antennas, an antenna port number, and a quantity of antenna ports. The power-domain resource may include at least one of the following information: a power value, a power range, a power offset, and a power threshold.

For example, the SCI 1 may be used to schedule the time-domain resource and the frequency-domain resource of the PSSCH, and the SCI 2-1 may be used to schedule the code-domain resource of the SCI 2-2 and the power-domain resource of the PSSCH.

For example, the SCI 1 may include a start symbol position, an end symbol position, a symbol length, an index of an RB, a quantity of RBs, and the like of the PSSCH. The SCI 2-1 may include a codeword, a stream, and a layer that are of the SCI 2-2, and a power value of the PSSCH, and the like.

For example, after the first terminal device successfully performs blind detection on the SCI 1, the first terminal device may receive the PSSCH based on related information of the PSSCH indicated in the SCI 1. After the first terminal device successfully performs blind detection on the SCI 2-1, the first terminal device may receive the SCI 2-2 and/or the PSSCH based on related information of the SCI 2-2 indicated in the SCI 2-1 and/or related information of the PSSCH.

If the terminal device in the communication system shown in FIG. 1 supports both the SCI 1 and the SCI 2 or the SCI 2-1, for a terminal device (or referred to as a receiving terminal) that receives SCI, regardless of whether the terminal device supports (or regardless of whether a sending terminal indicates a type of SCI that the receiving terminal needs to detect) the foregoing two types of SCI, the terminal device needs to blindly detect sidelink control information in a position in which the SCI 1 may possibly be sent and a position in which the SCI 2 or the SCI 2-1 may possibly be sent. Consequently, complexity of blindly detecting the sidelink control information by the terminal device is high.

For example, the terminal device 104 in FIG. 1 supports the SCI 1 but does not support the SCI 2 or the SCI 2-1. However, the terminal device 104 needs to blindly detect sidelink control information in a position in which the SCI 1 may possibly be sent and a position in which the SCI 2 or the SCI 2-1 may possibly be sent. Consequently, complexity of blindly detecting the sidelink control information by the terminal device 104 is high.

To resolve the problem that complexity of blindly detecting the sidelink control information by a terminal device is high, the embodiments of this application provide a sidelink control information sending method. For a specific process of the method, refer to the descriptions in an embodiment corresponding to FIG. 3. By using the method, the receiving terminal may determine a type of sidelink control information received by the receiving terminal, blindly detect sidelink control information only in a position in which this type of sidelink control information may possibly be sent, without a need to blindly detect sidelink control information in positions corresponding to all types of sidelink control information. This reduces complexity of blindly detecting the sidelink control information by the receiving terminal.

It should be noted that in the embodiments of this application, the sending terminal and the receiving terminal are relative concepts. The sending terminal may be a terminal that sends sidelink control information, and the receiving terminal may be a terminal that receives sidelink control information.

Optionally, each network element in FIG. 1 in the embodiments of this application, for example, the network device 102 or the terminal device 107, may be a functional module in a device. It can be understood that the functional module may be a network component in a hardware device, for example, a communication chip in a mobile phone; or may be a software function running on dedicated hardware; or may be a virtualized function instantiated on a platform (for example, a cloud platform).

Figure 2:
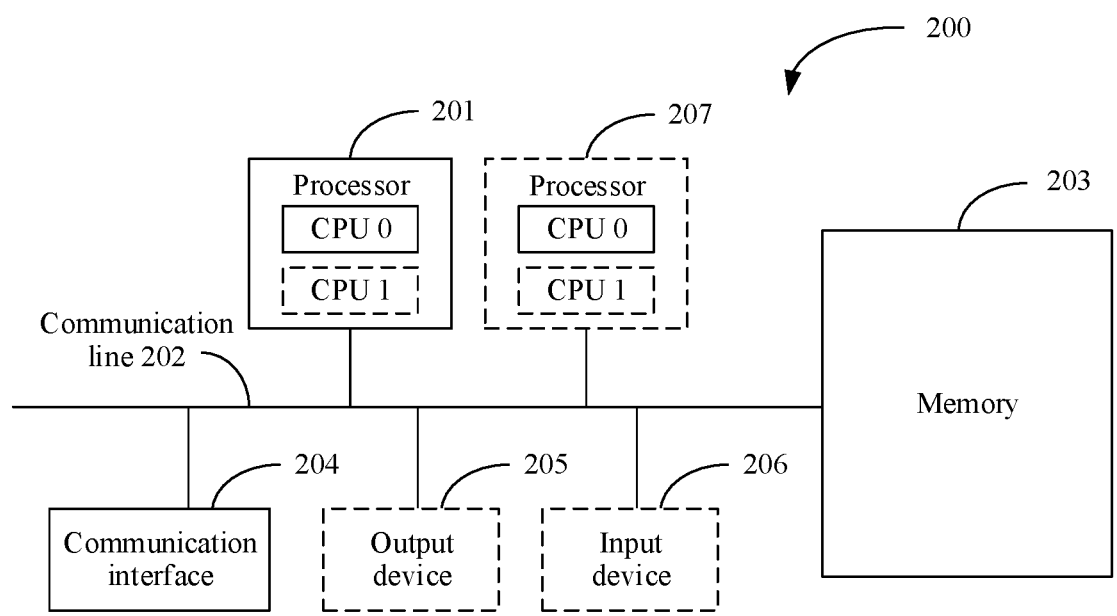
FIG. 2 is a schematic diagram depicting a structure of hardware of a communication device, according to an embodiment of this application.

For example, all the network elements in FIG. 1 may be implemented by using a communication device 200 in FIG. 2. FIG. 2 is a schematic diagram depicting a structure of hardware of a communication device, applicable to the embodiments of this application. The communication device 200 includes at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits that are configured to control execution of programs in the solutions of this application.

The communication line 202 may include a channel over which information is transmitted between the foregoing components, for example, a bus.

The communication interface 204 communicates with another device or a communication network by using any apparatus such as a transceiver, for example, an Ethernet interface, a radio access network (RAN) interface, or a wireless local area network (WLAN) interface.

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a Blu-ray disc, or the like), a magnetic disk storage medium or another magnetic storage device, or any other medium capable of carrying or storing expected program code in a form of instructions or data structures and capable of being accessed by a computer. However, the memory 203 is not limited thereto. The memory may exist independently, and is connected to the processor through the communication line 202. The memory may alternatively be integrated with the processor. The memory provided in the embodiments of this application may usually be a non-volatile memory. The memory 203 is configured to store computer-executable instructions for executing the solutions of this application, and the processor 201 controls the execution. The processor 201 is configured to execute the computer-executable instructions stored in the memory 203, to implement the method provided in the embodiments of this application.

Optionally, the compute-executable instructions in the embodiments of this application may also be referred to as application program code. This is not specifically limited in the embodiments of this application.

During specific implementation, in an embodiment, the processor 201 may include one or more CPUs, for example, a CPU 0 and a CPU 1 in FIG. 2.

During specific implementation, in an embodiment, the communication device 200 may include a plurality of processors, for example, the processor 201 and a processor 207 in FIG. 2. Each of the processors may be a single-core (e.g., single-CPU) processor, or may be a multi-core (e.g., multi-CPU) processor. The processor herein may be one or more devices, circuits, and/or processing cores configured to process data (for example, computer program instructions).

During specific implementation, in an embodiment, the communication device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive user input in a plurality of manners. For example, the input device 206 may be a mouse, a keyboard, a touchscreen device, or a sensing device.

During specific implementation, the communication device 200 may be a desktop computer, a portable computer, a network server, a palmtop computer (e.g., personal digital assistant, PDA), a mobile phone, a tablet computer, a wireless terminal device, an embedded device, or a device having a structure similar to that in FIG. 2. A type of the communication device 200 is not limited in the embodiments of this application.

The following uses an example in which sidelink control information is SCI to specifically describe the sidelink control information sending method provided in the embodiments of this application with reference to FIG. 1 and FIG. 2.

Figure 3:
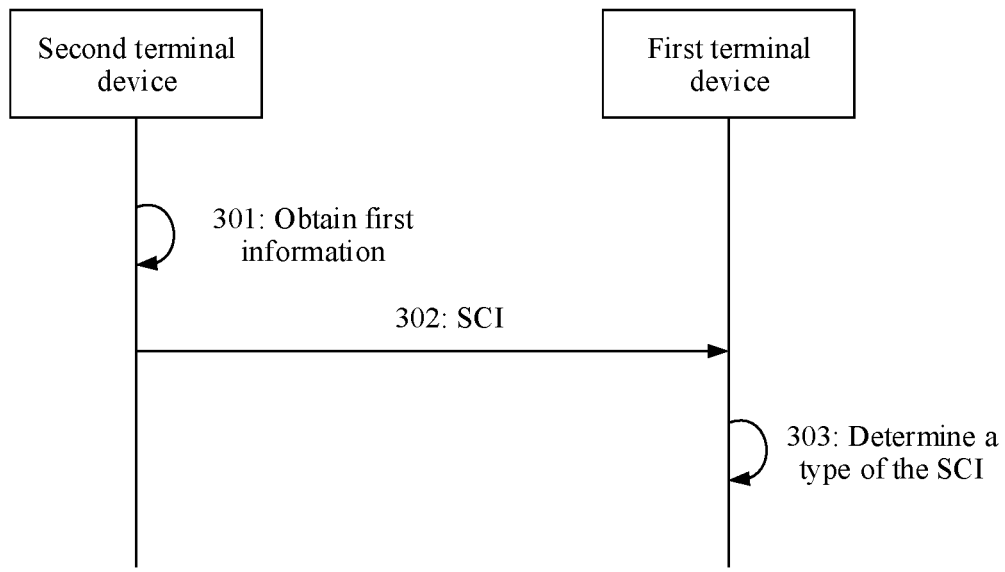
FIG. 3 is a schematic flowchart of a sidelink control information sending method, according to an embodiment of this application.

FIG. 3 shows an SCI sending method, according to an embodiment of this application. The SCI sending method includes step 301 to step 303.

Step 301: A second terminal device obtains first information.

The second terminal device may be any terminal device that sends SCI. For example, the second terminal device may be the terminal device 103 in FIG. 1 or the terminal device 105 in FIG. 1.

The first information may be used to indicate a type of SCI that is sent by the second terminal device to a first terminal device. As described above, there may be the following types of SCI: SCI 1 and SCI 2; or SCI 1 and SCI 2-1.

The first terminal device may be any terminal device that receives the SCI sent by the second terminal device. For example, when the second terminal device is the terminal device 103, the first terminal device may be the terminal device 104 in FIG. 1; when the second terminal device is the terminal device 105, the first terminal device may be the terminal devices 106 to 109 in FIG. 1.

Optionally, the SCI includes resource indication information, and the resource indication information is used to indicate a resource of data and/or a resource of SCI 2-2.

It should be noted that, for specific descriptions of the SCI, refer to corresponding descriptions of the communication system 100 corresponding to FIG. 1. Details are not described herein again.

Example 1: The first information may include characteristic information.

The characteristic information may be information about a type that is implicitly associated with the SCI. Specifically, the characteristic information may include at least one of the following information: radio network temporary identifier (RNTI) information, search space information, transmission resource information, and other information. This is not limited.

The RNTI information may include an RNTI. The RNTI is used by the second terminal device to scramble cyclic redundancy check (CRC) of the SCI that is sent by the second terminal device to the first terminal device. Correspondingly, the first terminal device receives the SCI, and uses the RNTI to descramble the CRC of the SCI.

The search space information may include a type of a search space and/or an index of the search space, where the search space is a resource range for a receiving terminal to search for the SCI.

The transmission resource information may include an index of a transmission resource, where the transmission resource is a time-frequency resource for transmitting a PSCCH.

Optionally, there is an association relationship between the characteristic information and the type of the SCI. The association relationship may be generated by a network device based on a service type, a transmission delay, a data transmission block size, and the like, and is configured by the network device for the first terminal device and the second terminal device. Alternatively, the association relationship is generated by the second terminal device based on a service type, a transmission delay, a data transmission block size, and the like, and is configured by the second terminal device for the first terminal device.

For example, a service type 1 is a common message, and the network device or the second terminal device may determine that a type of SCI corresponding to the service type 1 is SCI 2-1, and associate an RNTI corresponding to the service type 1 with the SCI 2-1.

For example, the network device or the second terminal device may determine that a type of SCI with a shorter transmission delay is SCI 2-1, and associate the SCI 2-1 with a search space before a slot. The network device or the second terminal device may determine that a type of SCI with a shorter transmission delay is SCI 2-1, and associate the SCI 2-1 with a transmission resource that occupies a smaller quantity of symbols in a slot.

For example, the network device or the second terminal device may determine that a type of SCI of a smaller data transmission block TB1 is SCI 1, and associate the SCI 1 with a transmission resource index including a smaller quantity of transmission resources. The network device or the second terminal device may determine that a type of SCI of a larger data transmission block TB2 is SCI 2-1, and associate the SCI 2-1 with a transmission resource index that includes a larger quantity of transmission resources.

A specific form of the association relationship between the characteristic information and the type of the SCI is not limited in this embodiment of this application. The association relationship between the characteristic information and the type of the SCI may be in a list form, an array form, or another form. This is not limited. This embodiment of this application describes an example in which the association relationship between the characteristic information and the type of the SCI is in a list form.

For example, the characteristic information includes the RNTI information, and the RNTI information includes the RNTI. Table 1 lists an association relationship between the RNTI and the type of the SCI. As listed in Table 1, a type of SCI corresponding to an RNTI 1 is SCI 1, a type of SCI corresponding to an RNTI 2 is SCI 2 or SCI 2-1, a type of SCI corresponding to an RNTI 3 is SCI 1, a type of SCI corresponding to an RNTI 4 is SCI 1, and a type of SCI corresponding to an RNTI 5 is SCI 2 or SCI 2-1.

TABLE 1

| RNTI | Type of SCI |
| --- | --- |
| RNTI 1 | SCI 1 |
| RNTI 2 | SCI 2 or SCI 2-1 |
| RNTI 3 | SCI 1 |
| RNTI 4 | SCI 1 |
| RNTI 5 | SCI 2 or SCI 2-1 |

For example, the characteristic information includes the search space information, and the search space information includes a type of search space, where the type of the search space may include a common search space and a dedicated search space. A person skilled in the art may understand that the type of the search space may further include another type of search space. This is not limited. Table 2 lists an association relationship between the type of the search space and the type of the SCI. As listed in Table 2, a type of SCI corresponding to the common search space is SCI 2-1, and a type of SCI corresponding to the dedicated search space is SCI 2-2.

TABLE 2

| Search space type | Type of SCI |
| --- | --- |
| Common search space | SCI 2-1 |
| Dedicated search space | SCI 2-2 |

For example, the characteristic information includes the search space information, and the search space information includes a search space index. Table 3 lists an association relationship between the search space index and the type of the SCI. As listed in Table 3, a type of SCI corresponding to a search space 1 is SCI 1, a type of SCI corresponding to a search space 2 is SCI 2 or SCI 2-1, a type of SCI corresponding to a search space 3 is SCI 2 or SCI 2-1, a type of SCI corresponding to a search space 4 is SCI 1, and a type of SCI corresponding to a search space 5 is SCI 2 or SCI 2-1.

TABLE 3

| Search space index | Type of SCI |
| --- | --- |
| Search space 1 | SCI 1 |
| Search space 2 | SCI 2 or SCI 2-1 |
| Search space 3 | SCI 2 or SCI 2-1 |
| Search space 4 | SCI 1 |
| Search space 5 | SCI 2 or SCI 2-1 |

For example, the characteristic information includes the transmission resource information, and the transmission resource information includes a transmission resource index. Table 4 lists an association relationship between the transmission resource index and the type of the SCI. As listed in Table 4, a type of SCI corresponding to a transmission resource 1 is SCI 1, a type of SCI corresponding to a transmission resource 2 is SCI 1, a type of SCI corresponding to a transmission resource 3 is SCI 2 or SCI 2-1, a type of SCI corresponding to a transmission resource 4 is SCI 2 or SCI 2-1, and a type of SCI corresponding to a transmission resource 5 is SCI 2 or SCI 2-1.

TABLE 4

| Transmission resource index | Type of SCI |
| --- | --- |
| Transmission resource 1 | SCI 1 |
| Transmission resource 2 | SCI 1 |
| Transmission resource 3 | SCI 2 or SCI 2-1 |
| Transmission resource 4 | SCI 2 or SCI 2-1 |
| Transmission resource 5 | SCI 2 or SCI 2-1 |

Example 2: The first information includes parameter information.

The parameter information may be parameter information used to determine the characteristic information in Example 1, for example, a value range of the characteristic information, an effective time of the characteristic information, an effective period of the characteristic information, an MCS, frequency hopping information, timing information, and the like.

Optionally, there is an association relationship between the parameter information and the type of the SC. The association relationship between the parameter information and the type of the SCI may be generated by a network device based on a service type, a transmission delay, a data transmission block size, and the like, and is configured by the network device for the first terminal device and the second terminal device. Alternatively, the association relationship is generated by the second terminal device based on a service type, a transmission delay, a data transmission block size, and the like, and is configured by the second terminal device for the first terminal device.

The parameter information is used as an example. Table 5 lists an association relationship between the parameter information and the type of the SCI. As listed in Table 5, a type of SCI corresponding to parameter information 1 is SCI 1, a type of SCI corresponding to parameter information 2 is SCI 2 or SCI 2-1, a type of SCI corresponding to parameter information 3 is SCI 1, a type of SCI corresponding to parameter information 4 is SCI 2 or SCI 2-1, and a type of SCI corresponding to parameter information 5 is SCI 2 or SCI 2-1.

TABLE 5

| Parameter information | Type of SCI |
| --- | --- |
| Parameter information 1 | SCI 1 |
| Parameter information 2 | SCI 2 or SCI 2-1 |
| Parameter information 3 | SCI 1 |
| Parameter information 4 | SCI 2 or SCI 2-1 |
| Parameter information 5 | SCI 2 or SCI 2-1 |

It should be noted that Table 1 to Table 4 are merely examples of the association relationship between the characteristic information and the type of the SCI. In actual application, the association relationship between the characteristic information and the type of the SCI may be a specific row or some specific rows of the foregoing tables, or may be the entirety of the tables, or include more association relationships than those listed in the tables. This is not specifically limited in this application. Likewise, Table 5 is merely an example of the association relationship between the parameter information and the type of the SCI. In actual application, the association relationship between the parameter information and the type of the SCI may be a specific row or some specific rows of the foregoing tables, or may be the entirety of the table, or include more association relationships than those listed in the table. This is not specifically limited in this application.

Optionally, that a second terminal device obtains first information includes: the second terminal device determines the type of the SCI, and obtains the first information based on the type of the SCI.

For example, the second terminal device may determine the type of the SCI based on a purpose (for example, common information, information occupied for listening to resources by another terminal device, a broadcast message whose receiving terminal is not limited, dedicated information of the first terminal device, a unicast message, or a multicast message) of control information to be sent to the first terminal device. When the first information includes the characteristic information, the second terminal device obtains the first information based on a determined type of SCI and an association relationship between the characteristic information and the type of the SCI. When the first information includes the parameter information, the second terminal device obtains the first information based on a determined type of SCI and an association relationship between the parameter information and the type of the SCI.

For example, if the control message to be sent to the first terminal device is the common information or the information occupied for listening to resources by another terminal device, the second terminal device may determine that the type of the SCI is SCI 1; may determine, according to Table 1, that the characteristic information is the RNTI 1, the RNTI 3, and the RNTI 4; and may determine, according to Table 3, that the characteristic information is the search space 1 and the search space 4; may determine, according to Table 4, that the characteristic information is the transmission resource 1 and the transmission resource 2; and may determine, according to Table 5, that the parameter information is the parameter information 1 and the parameter information 3.

For another example, if the service type is the dedicated information of the first terminal device, the second terminal device may determine that the type of the SCI is SCI 2 or SCI 2-1; determine, according to Table 1, that the characteristic information is the RNTI 2 and the RNTI 5; determine, according to Table 2, that the characteristic information is the common search space; determine, according to Table 3, that the characteristic information is the search space 2, the search space 3, and the search space 5; determine, according to Table 4, that the characteristic information is the transmission resource 3, the transmission resource 4, and the transmission resource 5; and determine, according to Table 5, that the parameter information is the parameter information 2, the parameter information 4, and the parameter information 5.

Step 302: The second terminal device sends the SCI to the first terminal device based on the first information.

Example 1: The first information includes the characteristic information.

For example, if the second terminal device determines that the characteristic information includes the RNTI 1, the second terminal device scrambles the SCI by using the RNTI 1, and sends the scrambled SCI to the first terminal device.

For example, if the second terminal device determines that the characteristic information includes the search space 1, the second terminal device sends the SCI to the first terminal device in the search space 1.

For example, if the second terminal device determines that the characteristic information includes the transmission resource 1, the second terminal device sends the SCI to the first terminal device on the transmission resource 1.

For example, if the second terminal device determines that the characteristic information includes the RNTI 1 and the search space 1, the second terminal device scrambles the SCI by using the RNTI 1, and sends the scrambled SCI to the first terminal device in the search space 1.

For example, if the second terminal device determines that the characteristic information includes the RNTI 1 and the transmission resource 1, the second terminal device scrambles the SCI by using the RNTI 1, and sends the scrambled SCI to the first terminal device on the transmission resource 1.

For example, if the second terminal device determines that the characteristic information includes the RNTI 1, the search space 1, and the transmission resource 1, the second terminal device scrambles the SCI by using the RNTI 1, and sends the scrambled SCI to the first terminal device on the transmission resource 1 in the search space 1.

Example 2: The first information includes the parameter information.

For example, the parameter information 1 is parameter information used to determine the RNTI 1, and the second terminal device may determine the RNTI 1 based on the parameter information 1. When the second terminal device sends the SCI to the first terminal device, the second terminal device may scramble CRC of the SCI by using the RNTI 1, and send the scrambled SCI to the first terminal device.

For example, the parameter information 2 is parameter information used to determine the search space 1, and the second terminal device may determine the search space 1 based on the parameter information 2, and send the SCI in the search space 1.

For example, the parameter information 3 is parameter information used to determine the transmission resource 1, and the second terminal device may determine the transmission resource 1 based on the parameter information 3, and send the SCI on the transmission resource 1.

Step 303: The first terminal device receives the SCI sent by the second terminal device, and determines the type of the SCI based on the first information.

Example 1: The first information includes the characteristic information.

Optionally, the first terminal device determines the type of the SCI based on the characteristic information and the association relationship between the characteristic information and the type of the SCI.

For example, the first terminal device receives the SCI and descrambles the SCI. If the first terminal device successfully descrambles the SCI by using the RNTI 1, the first terminal device may determine, based on the association relationship between the RNTI and the type of the SCI (as listed in Table 1), that the type of the SCI is the SCI 1.

For example, if the first terminal device receives the SCI in the common search space, the first terminal device may determine, based on the association relationship between the type of the search space and the type of the SCI (as listed in Table 2), that the type of the SCI is SCI 2-1.

For example, if the first terminal device receives the SCI in the search space 1, the first terminal device may determine, based on the association relationship between the search space index and the type of the SCI (as listed in Table 3), that the type of the SCI is SCI 1.

For example, if the first terminal device receives the SCI on the transmission resource 1, the first terminal device may determine, based on the association relationship between the transmission resource index and the type of the SCI (as listed in Table 4), that the type of the SCI is SCI 1.

For example, the first terminal device receives the SCI in the common search space and descrambles the SCI. If the first terminal device successfully descrambles the SCI by using the RNTI 2, the first terminal device may determine, based on the association relationship between the RNTI and the type of the SCI (as listed in Table 1) and the association relationship between the search space type and the type of the SCI (as listed in Table 2), that the type of the SCI is SCI 2-1.

For example, the first terminal device receives the SCI in the search space 1 and descrambles the SCI. If the first terminal device successfully descrambles the SCI by using the RNTI 1, the first terminal device may determine, based on the association relationship between the RNTI and the type of the SCI (as listed in Table 1) and the association relationship between the search space index and the type of the SCI (as listed in Table 3), that the type of the SCI is SCI 1.

For example, the first terminal device receives the SCI on the transmission resource 1 and descrambles the SCI. If the first terminal device successfully descrambles the SCI by using the RNTI 1, the first terminal device may determine, based on the association relationship between the RNTI and the type of the SCI (as listed in Table 1) and the association relationship between the transmission resource index and the type of the SCI (as listed in Table 4), that the type of the SCI is the SCI 1.

Example 2: The first information includes the parameter information.

Optionally, the first terminal device determines the type of the SCI based on the parameter information and the association relationship between the parameter information and the type of the SCI.

For example, the parameter information 1 is parameter information used to determine the RNTI 1. When receiving the SCI scrambled by using the RNTI 1, the first terminal device may descramble the scrambled SCI by using the RNTI 1 that is determined by using the parameter information 1. The first terminal device may determine the type of the SCI based on the parameter information 1 and the association relationship between the parameter information 1 and the type of the SCI.

For example, the parameter information 2 is parameter information used to determine the search space 1. When receiving the SCI, the first terminal device receives, in the search space 1 that is determined by using the parameter information 2, the SCI sent by the second terminal device. The first terminal device may determine the type of the SCI based on the parameter information 2 and the association relationship between the parameter information 2 and the type of the SCI.

For example, the parameter information 3 is parameter information used to determine the transmission resource 1. When receiving the SCI, the first terminal device receives, on the transmission resource 1 that is determined by using the parameter information 3, the SCI sent by the second terminal device. The first terminal device may determine the type of the SCI based on the parameter information 3 and the association relationship between the parameter information 3 and the type of the SCI.

Further, optionally, after the first terminal device determines the type of the SCI, if the type of the SCI is a type of SCI to be detected by the first terminal device, the first terminal device blindly detects the SCI; if the type of the SCI is not a type of SCI to be detected by the first terminal device, the first terminal device does not blindly detect the SCI.

According to the method shown in FIG. 3, after obtaining the first information, the second terminal device may send the SCI to the first terminal device based on the first information, and the first terminal device may determine the type of the SCI based on the first information, and further may blindly detect only a type of SCI that the first terminal device needs to detect. This reduces complexity of blindly detecting SCI by the first terminal device.

Figure 4:
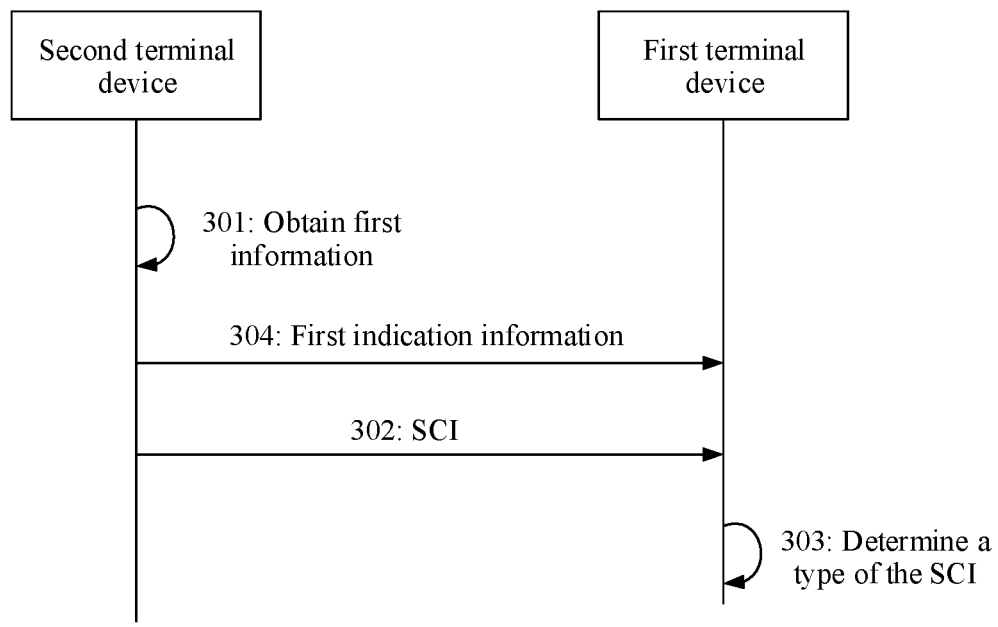
FIG. 4 is a schematic flowchart of a sidelink control information sending method, according to an embodiment of this application.

Further, the second terminal device may further send, to the first terminal device, the type of the SCI to be detected by the first terminal device, so that the second terminal device adjusts the type of the SCI to be detected by the first terminal device. As shown in FIG. 4, the method shown in FIG. 3 may further include step 304.

Step 304: The second terminal device sends first indication information to the first terminal device.

The first indication information may be used to indicate a type of SCI to be detected by the first terminal device. The first indication information may include one or more binary bits. When the first indication information indicates one or two types of SCI to be detected by the first terminal device, the first indication information may include one binary bit. When the first indication information indicates more than two types of SCI to be detected by the first terminal device, the first indication information may include a plurality of binary bits.

For example, if the first indication information is 1, it may indicate that the first terminal device detects SCI whose type is the SCI 2 or the SCI 2-1. When determining that the type of the SCI is the SCI 2 or the SCI 2-1, the first terminal device obtains data information carried in the SCI 2-1 and/or information about SCI 2-2. When determining that the type of the SCI is the SCI 1, the first terminal device does not obtain data information carried in the SCI 1. If the first indication information is 0, it may indicate that the first terminal device does not detect SCI whose type is the SCI 2 or the SCI 2-1. When determining that the type of the SCI is the SCI 1, the first terminal device obtains data information carried in the SCI 1. When the first terminal device determines that the type of the SCI is the SCI 2 or the SCI 2-1, the first terminal device does not obtain data information carried in the SCI 2-1 and/or information about SCI 2-2.

For example, if the first indication information is 00, it may indicate that the first terminal device detects SCI whose type is the SCI 1. When determining that the type of the SCI is the SCI 1, the first terminal device obtains data information carried in the SCI 1. When determining that the type of the SCI is the SCI 2 or the SCI 2-1, the first terminal device does not obtain data information carried in the SCI 2-1 and/or information about SCI 2-2. If the first indication information is 01, it may indicate that the first terminal device detects SCI whose type is the SCI 2 or the SCI 2-1. When determining that the type of the SCI is the SCI 2 or the SCI 2-1, the first terminal device obtains data information carried in the SCI 2-1 and/or information about SCI 2-2. When determining that the type of the SCI is the SCI 1, the first terminal device does not obtain data information carried in the SCI 1. If the first indication information is 11, it may indicate that the first terminal device needs to detect two types of SCI, and the first terminal device determines that the type of the SCI is the SCI 2 or the SCI 2-1. The first terminal device obtains data information carried in the SCI 2-1 and/or information about SCI 2-2. When the first terminal device determines that the type of the SCI is the SCI 1, the first terminal device obtains data information carried in the SCI 1.

It should be noted that step 304 may be performed after step 301 and before step 302, as shown in FIG. 4; or step 304 may be performed before step 301. This is not limited in this embodiment of this application.

According to the method shown in FIG. 4, the second terminal device may adjust the type of the SCI to be detected by the first terminal device, and the first terminal device may determine the type of the SCI based on the first information, and further may blindly detect only a type of SCI that the first terminal device needs to detect. This reduces complexity of blindly detecting SCI by the first terminal device.

Further, the first terminal device may further report, to the second terminal device, a type of SCI supported by the first terminal device. For specific descriptions of the process, refer to step 305. Step 305 may be combined with the method shown in FIG. 3 and is performed before step 301 shown in FIG. 3; or step 305 may be combined with the method shown in FIG. 4 and is performed before step 301 shown in FIG. 4. The following provides descriptions by using only the example in which step 305 is combined with the method shown in FIG. 4.

Step 305: The first terminal device sends second indication information to the second terminal device.

The second indication information may be used to indicate a type of SCI supported by the first terminal device.

Optionally, the first terminal device periodically sends the second indication information to the second terminal device.

Optionally, the second indication information may be used to indicate the type of the SCI supported by the first terminal device. The second indication information may include one or more binary bits. When the second indication information indicates one or two types of SCI supported by the first terminal device, the second indication information may include one binary bit. When the second indication information indicates more than two types of SCI supported by the first terminal device, the second indication information may include a plurality of binary bits.

For example, if the first indication information is 1, it may indicate that the type of the SCI supported by the first terminal device is the SCI 2 or the SCI 2-1, and the second terminal device may send, to the first terminal device, SCI whose type is the SCI 2 or the SCI 2-1. If the first indication information is 0, it may indicate that the type of SCI not supported by the first terminal device is the SCI 2 or the SCI 2-1, and the second terminal device may send, to the first terminal device, SCI whose type is the SCI 1.

For example, if the first indication information is 00, it may indicate that the type of the SCI supported by the first terminal device is the SCI 1, and the second terminal device may send SCI whose type is the SCI 1 to the first terminal device. If the first indication information is 01, it may indicate that the type of the SCI supported by the first terminal device is the SCI 2 or the SCI 2-1, and the second terminal device may send SCI whose type is the SCI 2 or the SCI 2-1 to the first terminal device. If the first indication information is 11, it may indicate that the first terminal device supports both types of SCI, and the second terminal device may send SCI whose type is the SCI 2 or the SCI 2-1 to the first terminal device, or the second terminal device may send SCI whose type is the SCI 1 to the first terminal device.

It should be noted that step 305 may alternatively be implemented as an independent embodiment.

Figure 5:
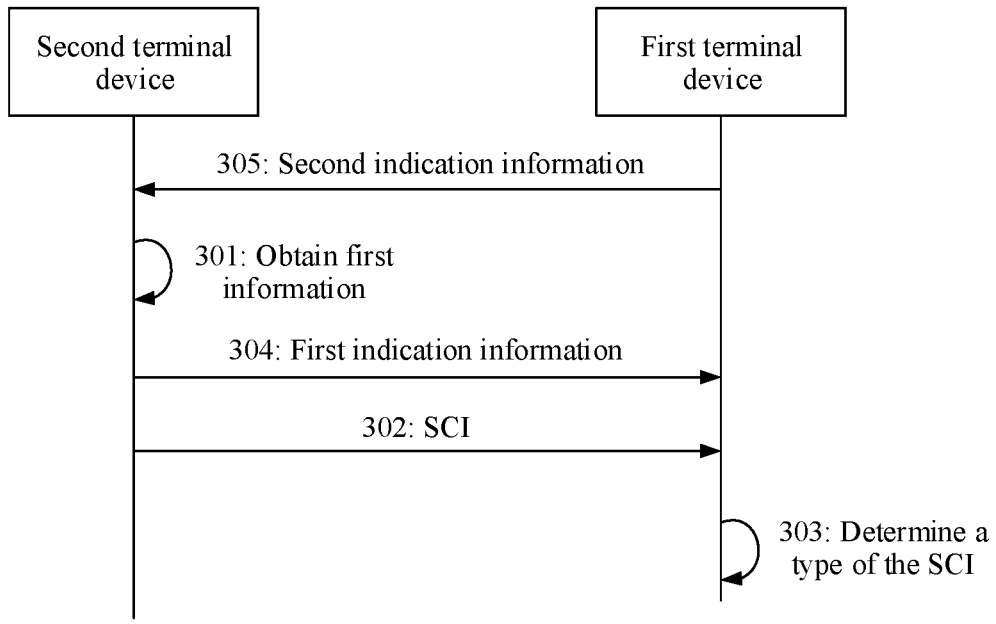
FIG. 5 is a schematic flowchart of a sidelink control information sending method, according to an embodiment of this application.

According to the method shown in FIG. 5, the first terminal device may report the type of the SCI supported by the first terminal device, and the second terminal device may send a type of SCI supported by the second terminal device to the first terminal device.

The methods shown in FIG. 3 to FIG. 5 are described only by using the example in which the first information is the characteristic information or the parameter information. In addition to the characteristic information or the parameter information, the first information may alternatively be indication information indicating a type of sidelink control information, that is, the first information explicitly indicates the type of the sidelink control information. For details, refer to methods shown in FIG. 6 to FIG. 7.

Figure 6:
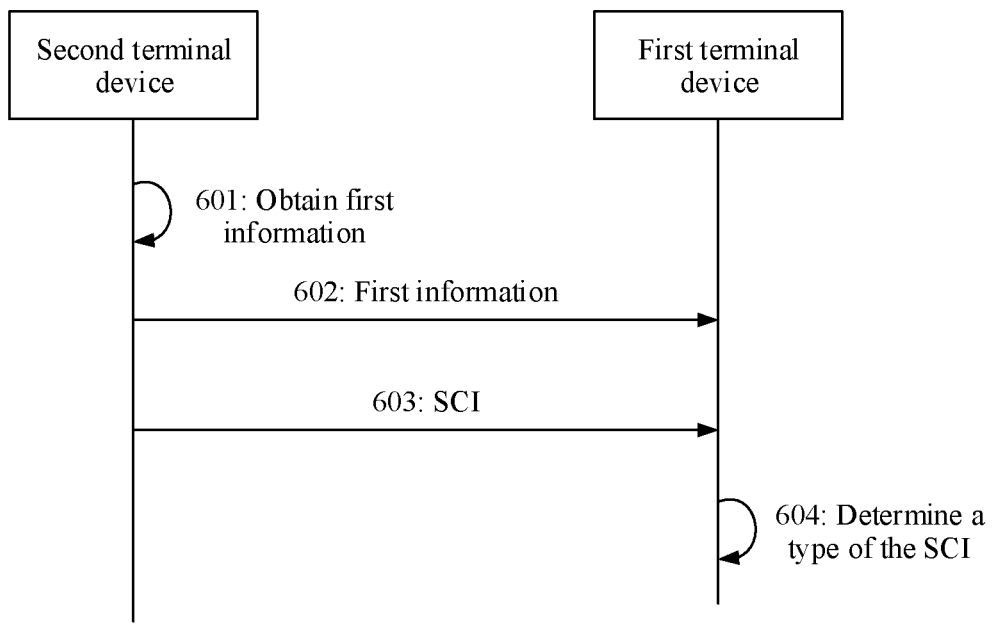
FIG. 6 is a schematic flowchart of a sidelink control information sending method, according to an embodiment of this application.

FIG. 6 shows still another SCI sending method, according to an embodiment of this application. The SCI sending method includes step 601 to step 604.

Step 601: A second terminal device obtains first information.

The second terminal device may be the terminal device 103 in FIG. 1 or the terminal device 105 in FIG. 1. The first information is used to indicate a type of SCI that is sent by the second terminal device to a first terminal device.

The first terminal device may be the terminal device 104 in FIG. 1 or the terminal devices 106 to 109 in FIG. 1. There may be the following types of SCI: SCI 1 and SCI 2; or SCI 1 and SCI 2-1.

Optionally, the first information includes indication information indicating the type of the SCI.

For example, the first information includes 1-bit indication information, 0 is used to indicate the SCI 1, and 1 is used to indicate the SCI 2 or the SCI 2-1; or 0 is used to indicate the SCI 2 or the SCI 2-1, and 1 is used to indicate the SCI 1.

Optionally, that a second terminal device obtains first information includes: the second terminal device receives the first information sent by a network device; or the second terminal device determines the type of the SCI and obtains the first information based on the type of the SCI.

For example, the second terminal device receives indication information 0 sent by the network device, and this indicates that the type of the SCI is the SCI 1; the second terminal device receives indication information 1 sent by the network device, and this indicates that the type of the SCI is the SCI 2 or the SCI 2-1. Alternatively, the second terminal device receives indication information 0 sent by the network device, and this indicates that the type of the SCI is the SCI 2 or the SCI 2-1; the second terminal device receives indication information 1 sent by the network device, and this indicates that the type of the SCI is the SCI 1.

For example, the second terminal device may determine the type of the SCI based on a service type (for example, common information, information occupied for listening to resources by another terminal device, or dedicated information of the first terminal device), and obtain the first information based on the type of the SCI. For example, if the service type is the common information or the information occupied for listening to resources by another terminal device, the second terminal device may determine that the type of the SCI is the SCI 1, and further the second terminal device may determine that the first information includes 0. If the service type is the dedicated information of the first terminal device, the second terminal device may determine that the type of the SCI is the SCI 2 or the SCI 2-1, and further the second terminal device may determine that the first information includes 1. If the service type is the common information or the information occupied for listening to resources by another terminal device, the second terminal device may determine that the type of the SCI is the SCI 1, and further the second terminal device may determine that the first information includes 1. If the service type is the dedicated information of the first terminal device, the second terminal device may determine that the type of the SCI is the SCI 2 or the SCI 2-1, and further the second terminal device may determine that the first information includes 0.

Step 602: The second terminal device sends the first information to the first terminal device.

Optionally, the first information is radio resource control signaling, media access control signaling, a master information block, a system information block, or physical control information, where the physical control information includes previous sidelink control information.

For example, the first information is the radio resource control signaling, and the second terminal device may send indication information to the first terminal device by using the radio resource control signaling.

Step 603: The second terminal device sends the SCI to the first terminal device based on the first information.

For example, the first information includes 0. If 0 is used to indicate the SCI 1, the second terminal device sends SCI whose type is the SCI 1 to the first terminal device. If 0 is used to indicate the SCI 2 or the SCI 2-1, the second terminal device sends SCI whose type is the SCI 2 or the SCI 2-1 to the first terminal device.

For example, the first information includes 1. If 1 is used to indicate the SCI 2 or the SCI 2-1, the second terminal device sends SCI whose type is the SCI 2 or the SCI 2-1 to the first terminal device. If 1 is used to indicate the SCI 1, the second terminal device sends SCI whose type is the SCI 1 to the first terminal device.

Step 604: The first terminal device determines the type of the SCI based on the first information.

For example, the first information includes 0. If 0 is used to indicate the SCI 1, the first terminal device determines that the type of the SCI is the SCI 1. If 0 is used to indicate the SCI 2 or the SCI 2-1, the first terminal device determines that the type of the SCI is the SCI 2 or the SCI 2-1.

For example, the first information includes 1. If 1 is used to indicate the SCI 2 or the SCI 2-1, the first terminal device determines that the type of the SCI is the SCI 2 or the SCI 2-1. If 1 is used to indicate the SCI 1, the first terminal device determines that the type of the SCI is the SCI 1.

Optionally, after the first terminal device determines the type of the SCI, if the type of the SCI is a type of SCI to be detected by the first terminal device, the first terminal device blindly detects the SCI; if the type of the SCI is not a type of SCI to be detected by the first terminal device, the first terminal device does not blindly detect the SCI.

According to the method shown in FIG. 6, after obtaining the first information, the second terminal device may send the SCI to the first terminal device based on the first information, and the first terminal device may determine the type of the SCI based on the first information, and further may blindly detect only a type of SCI that the first terminal device needs to detect. This reduces complexity of blindly detecting SCI by the first terminal device.

Figure 7:
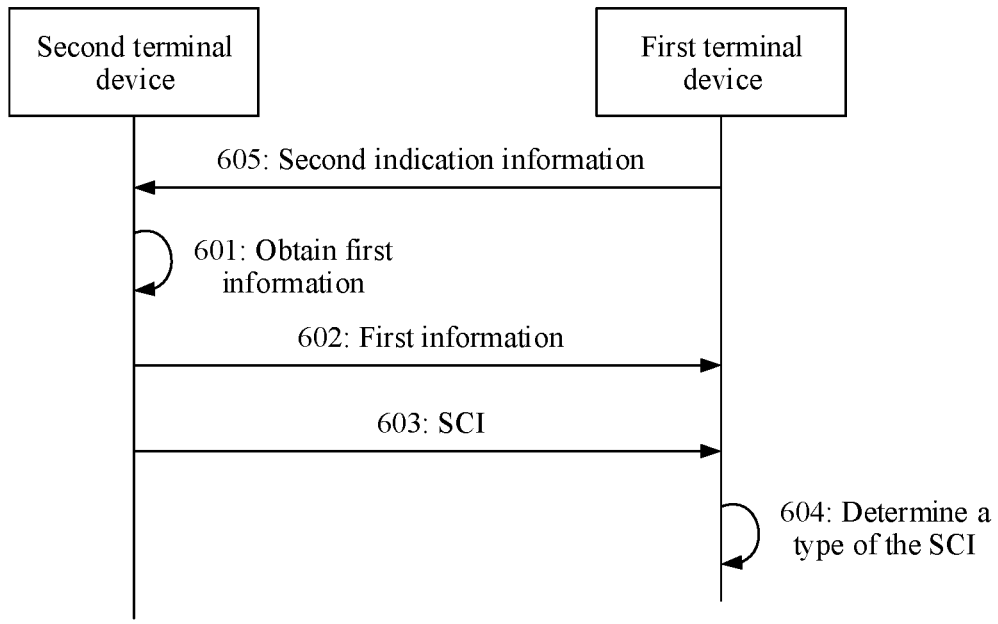
FIG. 7 is a schematic flowchart of a sidelink control information sending method, according to an embodiment of this application.

Further, the first terminal device may further report, to the second terminal device, a type of SCI supported by the first terminal device, so that the second terminal device sends, to the first terminal device, the type of the SCI supported by the first terminal device. As shown in FIG. 7, the method shown in FIG. 6 may further include step 605.

Step 605: The first terminal device sends second indication information to the second terminal device.

For a specific process of step 605, refer to step 305. Details are not described herein again.

According to the method shown in FIG. 7, the first terminal device may report the type of the SCI supported by the first terminal device, and the second terminal device may send a type of SCI supported by the second terminal device to the first terminal device.

The methods shown in FIG. 6 and FIG. 7 are described only by using the following example: the first information is the indication information indicating the type of the sidelink control information; and the second terminal device sends the indication information to the first terminal device, and explicitly indicates the type of the SCI that is sent by the second terminal device to the first terminal device. In addition, a network device may alternatively send the indication information indicating the type of the sidelink control information to the first terminal device, to explicitly indicate the type of the SCI that is sent by the second terminal device to the first terminal device. For details, refer to FIG. 8 to FIG. 10.

Figure 8:
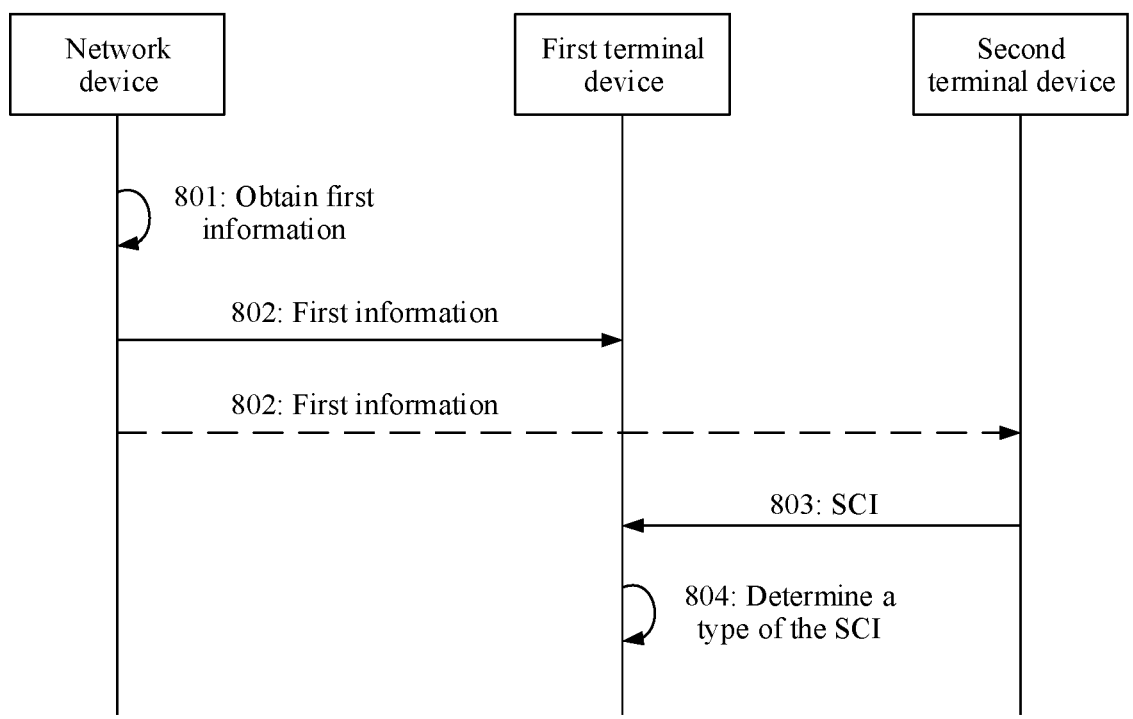
FIG. 8 is a schematic flowchart of a sidelink control information sending method, according to an embodiment of this application.

FIG. 8 shows still another SCI sending method, according to an embodiment of this application. The SCI sending method includes step 801 to step 804.

Step 801: A network device determines first information.

The network device may be the network device 101 in FIG. 1 or the network device 102 in FIG. 1. The first information is used to indicate a type of SCI that is sent by a second terminal device to a first terminal device.

For related descriptions of the first information, refer to step 601. Details are not described herein again.

For example, that a network device determines first information may include: the network device may determine, based on a service type, a transmission delay, a data transmission block size, and the like, the type of the SCI that is sent by the second terminal device to the first terminal device, and generate the first information based on the determined type of the SCI.

For example, indication information indicating SCI 1 is 0, and indication information indicating SCI 2 or SCI 2-1 is 1. If the network device determines that the second terminal device sends SCI whose type is the SCI 1 to the first terminal device, the network device determines that the first information includes 0. If the network device determines that the second terminal device sends SCI whose type is the SCI 2 or the SCI 2-1 to the first terminal device, the network device determines that the first information includes 1.

For another example, indication information indicating SCI 1 is 1, and indication information indicating SCI 2 or SCI 2-1 is 0. If the network device determines that the second terminal device sends SCI whose type is the SCI 1 to the first terminal device, the network device determines that the first information includes 1. If the network device determines that the second terminal device sends SCI whose type is the SCI 2 or the SCI 2-1 to the first terminal device, the network device determines that the first information includes 0.

Step 802: The network device sends the first information to the second terminal device or to the first terminal device and the second terminal device.

Optionally, the first information is radio resource control signaling, media access control signaling, a master information block, a system information block, or physical control information, where the physical control information includes downlink control information.

For example, the second terminal device sends the first information to the second terminal device or to the first terminal device and the second terminal device by using the radio resource control signaling.

For example, the network device sends the first information to the second terminal device, so that the second terminal device forwards the first information to the first terminal device, and sends the SCI to the first terminal device. Alternatively, the second terminal device determines characteristic information based on the first information, and sends the SCI to the first terminal device based on the characteristic information.

For example, the network device sends the first information to the second terminal device and the first terminal device, so that the second terminal device may send the SCI to the first terminal device based on the first information, and the first terminal device may determine the type of the SCI based on the first information.

Step 803: The second terminal device sends the SCI to the first terminal device based on the first information.

For example, the second terminal device receives the first information sent by the network device, forwards the first information to the first terminal device, and sends the SCI to the first terminal device. For example, if the first information includes 0, and 0 is used to indicate SCI 1, the second terminal device may forward the first information to the first terminal device, and send SCI whose type is the SCI 1 to the first terminal device.

For example, the second terminal device receives the first information sent by the network device, determines the characteristic information based on the first information, and sends the SCI to the first terminal device based on the characteristic information.

For example, the first information includes 1, and 1 is used to indicate SCI 2 or SCI 2-1. If the characteristic information includes an RNTI, RNTIs corresponding to SCI whose type is the SCI 2 or the SCI 2-1 include the RNTI 2 and the RNTI 5 according to Table 1. In this case, the second terminal device may scramble the SCI whose type is the SCI 2 or the SCI 2-1 by using the RNTI 2 or the RNTI 5, and send the scrambled SCI to the first terminal device.

For example, the first information includes 0, and 0 is used to indicate SCI 2 or SCI 2-1. If the characteristic information includes a type of a search space, a type of a search space corresponding to SCI whose type is the SCI 2-1 is the common search space according to Table 2. In this case, the second terminal device may send the SCI whose type is the SCI 2-1 to the first terminal device in the common search space.

For example, the first information includes 0, and 0 is used to indicate SCI 2 or SCI 2-1. If the characteristic information includes a search space index, search space indexes corresponding to SCI whose type is the SCI 2 or the SCI 2-1 include the search space 2, the search space 3, and the search space 5 according to Table 3. In this case, the second terminal device may send the SCI whose type is the SCI 2 or the SCI 2-1 to the first terminal device in the search space 2, the search space 3, or the search space 5.

For example, the first information includes 1, and 1 is used to indicate SCI 1. If the characteristic information includes a transmission resource index, transmission resource indexes corresponding to SCI whose type is the SCI 1 include the transmission resource 1 and the transmission resource 2 according to Table 4. In this case, the second terminal device may send the SCI whose type is the SCI 1 to the first terminal device on the transmission resource 1 or the transmission resource 2.

Step 804: The first terminal device determines the type of the SCI based on the first information.

For a specific process of step 804, refer to step 604. Details are not described herein again.

According to the method shown in FIG. 8, after determining the first information, the network device may send the first information to the second terminal device or to the first terminal device and the second terminal device. The second terminal device may send the SCI to the first terminal device based on the first information. The first terminal device may determine the type of the SC based on the first information, and further may blindly detect only a type of SCI that the first terminal device needs to detect. This reduces complexity of blindly detecting SCI by the first terminal device.

Figure 9:
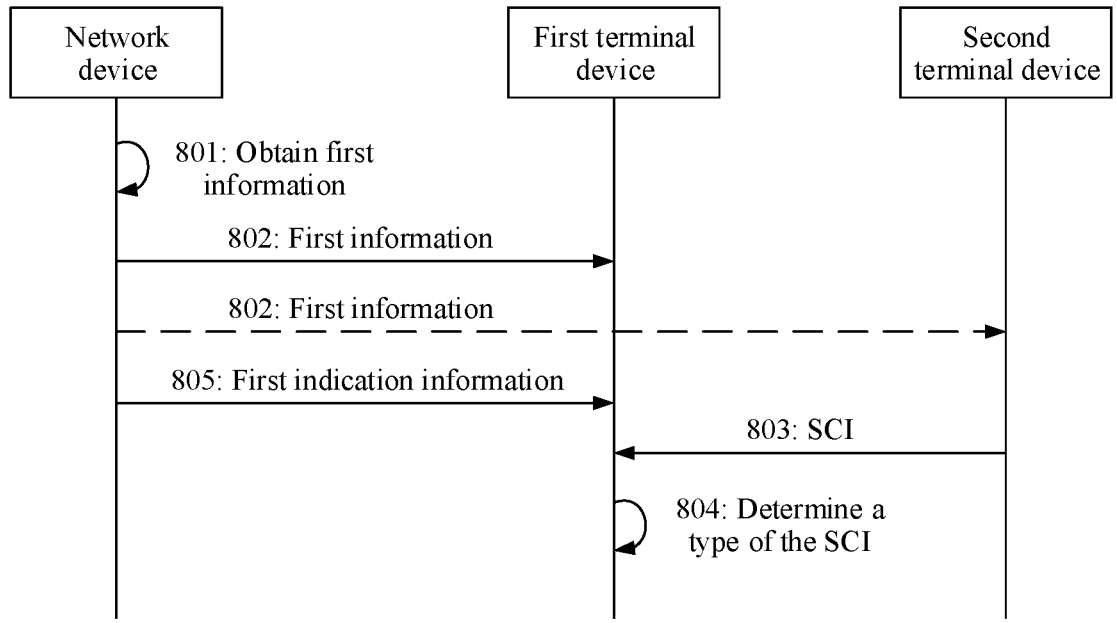
FIG. 9 is a schematic flowchart of a sidelink control information sending method, according to an embodiment of this application.

Further, the network device may further send, to the first terminal device, a type of SCI to be detected by the first terminal device, so that the network device adjusts the type of the SCI to be detected by the first terminal device. As shown in FIG. 9, the method shown in FIG. 8 may further include step 805.

Step 805: The network device sends first indication information to the first terminal device.

The first indication information may be used to indicate the type of the SCI to be detected by the first terminal device. The first indication information may be used to indicate, by using one bit, the type of the SCI to be detected by the first terminal device. The first indication information may include one or more binary bits. When the first indication information indicates one or two types of SCI to be detected by the first terminal device, the first indication information may include one binary bit. When the first indication information indicates more than two types of SCI to be detected by the first terminal device, the first indication information may include a plurality of binary bits.

For example, if the first indication information is 1, it may indicate that the first terminal device detects SCI whose type is the SCI 2 or the SCI 2-1. When determining that the type of the SCI is the SCI 2 or the SCI 2-1, the first terminal device obtains data information carried in the SCI 2-1 and/or information about SCI 2-2. When determining that the type of the SCI is the SCI 1, the first terminal device does not obtain data information carried in the SCI 1. If the first indication information is 0, it may indicate that the first terminal device does not detect SCI whose type is the SCI 2 or the SCI 2-1. When determining that the type of the SCI is the SCI 1, the first terminal device obtains data information carried in the SCI 1. When the first terminal device determines that the type of the SCI is the SCI 2 or the SCI 2-1, the first terminal device does not obtain data information carried in the SCI 2-1 and/or information about SCI 2-2.

For example, if the first indication information is 00, it may indicate that the first terminal device detects SCI whose type is the SCI 1. When determining that the type of the SCI is the SCI 1, the first terminal device obtains data information carried in the SCI 1. When determining that the type of the SCI is the SCI 2 or the SCI 2-1, the first terminal device does not obtain data information carried in the SCI 2-1 and/or information about SCI 2-2. If the first indication information is 01, it may indicate that the first terminal device detects SCI whose type is the SCI 2 or the SCI 2-1. When determining that the type of the SCI is the SCI 2 or the SCI 2-1, the first terminal device obtains data information carried in the SCI 2-1 and/or information about SCI 2-2. When determining that the type of SCI is the SCI 1, the first terminal device does not obtain data information carried in the SCI 1. If the first indication information is 11, it may indicate that the first terminal device needs to detect two types of SCI, and the first terminal device determines that the type of the SCI is the SCI 2 or the SCI 2-1. The first terminal device obtains data information carried in the SCI 2-1 and/or information about SCI 2-2. When the first terminal device determines that the type of the SCI is the SCI 1, the first terminal device obtains data information carried in the SCI 1.

It should be noted that step 805 may be performed after step 802 and before step 803, as shown in FIG. 9; or step 805 may be performed before step 801; or step 805 may be performed after step 801 and before step 802. This is not limited in this embodiment of this application.

According to the method shown in FIG. 9, the network device may adjust the type of the SCI to be detected by the first terminal device, and the first terminal device may determine the type of the SCI based on the first information, and further may blindly detect only the type of SCI that the first terminal device needs to detect. This reduces complexity of blindly detecting SCI by the first terminal device.

Further, the first terminal device may further report a type of SCI supported by the first terminal device to the network device, so that the network device indicates the second terminal device to send the type of the SCI supported by the first terminal device to the first terminal device. For specific descriptions of the process, refer to step 806. Step 806 may be combined with the method shown in FIG. 8 and performed before step 801 shown in FIG. 8; or step 806 may be combined with the method shown in FIG. 9 and performed before step 801 shown in FIG. 9. The following provides descriptions by using only the example in which step 806 is combined with the method shown in FIG. 9.

Figure 10:
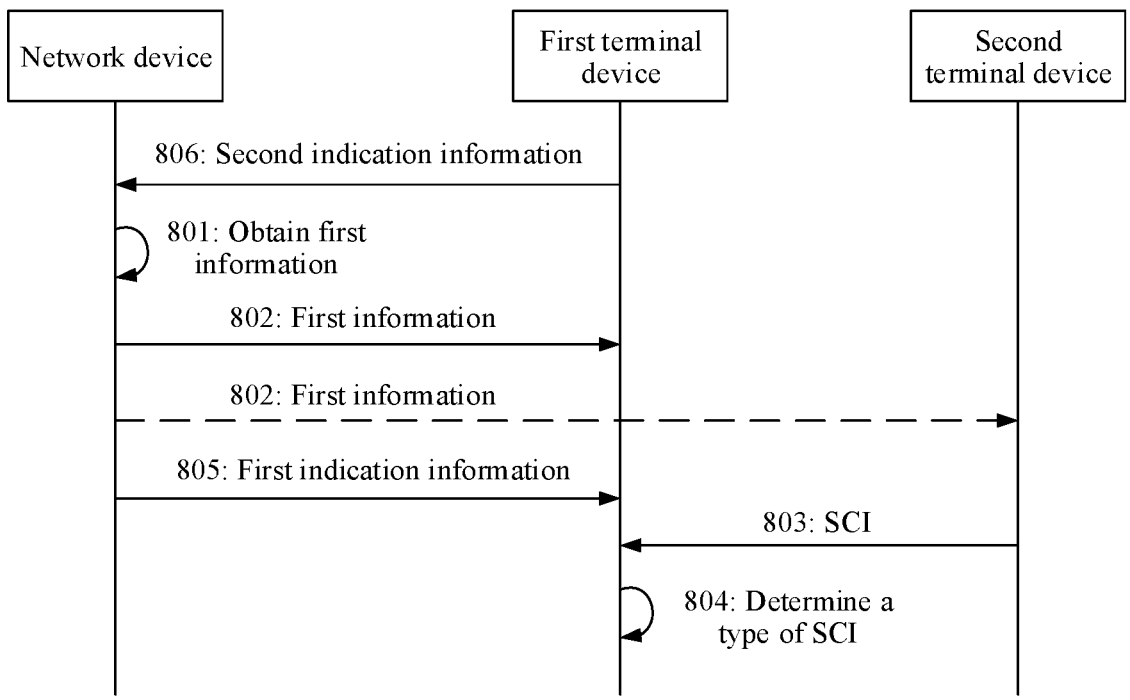
FIG. 10 is a schematic flowchart of a sidelink control information sending method, according to an embodiment of this application.

As shown in FIG. 10, the method shown in FIG. 9 further includes step 806.

Step 806: The first terminal device sends second indication information to the network device.

The second indication information may be used to indicate a type of SCI supported by the first terminal device.

Optionally, the first terminal device periodically sends the second indication information to the network device.

Optionally, the second indication information may be used to indicate, by using one bit, the type of the SCI supported by the first terminal device.

For example, if the first indication information is 1, it may indicate that the type of SCI supported by the first terminal device is the SCI 2 or the SCI 2-1, and the network device may indicate the second terminal device to send SCI whose type is the SCI 2 or the SCI 2-1 to the first terminal device. If the first indication information is 0, it may indicate that the type of SCI not supported by the first terminal device is the SCI 2 or the SCI 2-1, and the network device may indicate the second terminal device to send SCI whose type is the SCI 1 to the first terminal device.

Optionally, the first indication information may be used to indicate, by using bit information, the type of the SCI supported by the first terminal device.

For example, if the first indication information is 00, it may indicate that the type of SCI supported by the first terminal device is the SCI 1, and the network device may indicate the second terminal device to send SCI whose type is the SCI 1 to the first terminal device. If the first indication information is 01, it may indicate that the type of SCI supported by the first terminal device is the SCI 2 or the SCI 2-1, and the network device may indicate the second terminal device to send SCI whose type is the SCI 2 or the SCI 2-1 to the first terminal device. If the first indication information is 11, it may indicate that the first terminal device supports both types of SCI, and the network device may indicate the second terminal device to send SCI whose type is the SCI 2 or the SCI 2-1 to the first terminal device, or the network device may indicate the second terminal device to send SCI whose type is the SCI 1 to the first terminal device.

It should be noted that step 806 may alternatively be implemented as an independent embodiment.

According to the method shown in FIG. 10, the first terminal device may report the type of the SCI supported by the first terminal device, and the network device may indicate the second terminal device to send a type of SCI supported by the second terminal device to the first terminal device.

The foregoing mainly describes the solutions provided in the embodiments of this application from a perspective of interaction between the network elements. It can be understood that the foregoing terminal device, network device, or the like includes a corresponding hardware structure and/or software module for performing each function, to implement the foregoing functions. A person skilled in the art should be easily aware that, in combination with the examples of units and algorithm operations described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into functional modules of the first terminal device, the second terminal device, or the network device may be performed based on the method examples. For example, during division, each functional module may correspond to each function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, division into the modules may be performed in another manner.

Figure 11:
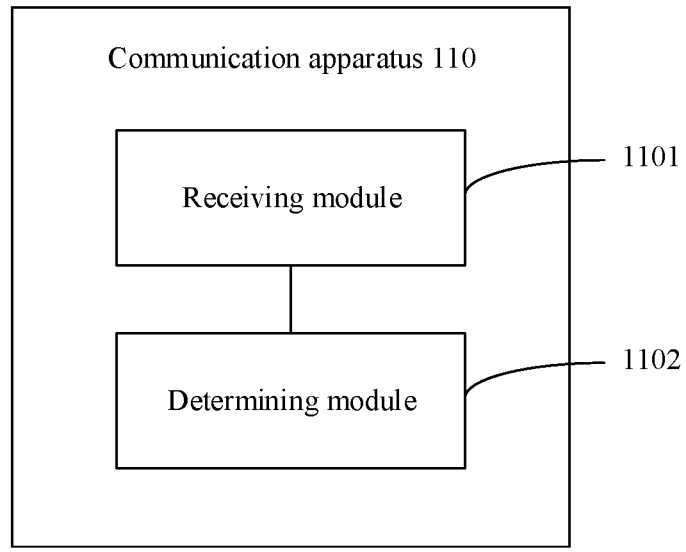
FIG. 11 is a schematic diagram depicting a structure of a communication apparatus, according to an embodiment of this application.

For example, when the functional modules are obtained through division in an integration manner, FIG. 11 is a schematic diagram depicting a structure of a communication apparatus 110. The communication apparatus 110 may be a terminal device, or a functional module or a chip that is in the terminal device and that can perform the method performed by the terminal device in this application, or the like. The communication apparatus 110 includes a receiving module 1101 and a determining module 1102. The receiving module 1101 is configured to receive sidelink control information sent by a second terminal device. The determining module 1102 is configured to determine a type of the sidelink control information based on first information.

Optionally, the receiving module 1101 is further configured to receive the first information sent by a network device or the second terminal device, where the first information includes indication information indicating the type of the sidelink control information.

Optionally, the first information is radio resource control signaling, media access control signaling, a master information block, a system information block, or physical control information, where the physical control information includes previous sidelink control information or downlink control information.

Optionally, the first information includes characteristic information. The determining module 1102 is specifically configured to determine the type of the sidelink control information based on the characteristic information and an association relationship between the characteristic information and the type of the sidelink control information.

Optionally, the characteristic information includes at least one of the following information: radio network temporary identifier information, search space information, and transmission resource information.

Optionally, the receiving module 1101 is further configured to receive first indication information sent by the second terminal device or the network device, where the first indication information is used to indicate a type of sidelink control information to-be-detected by the first terminal device.

Figure 12:
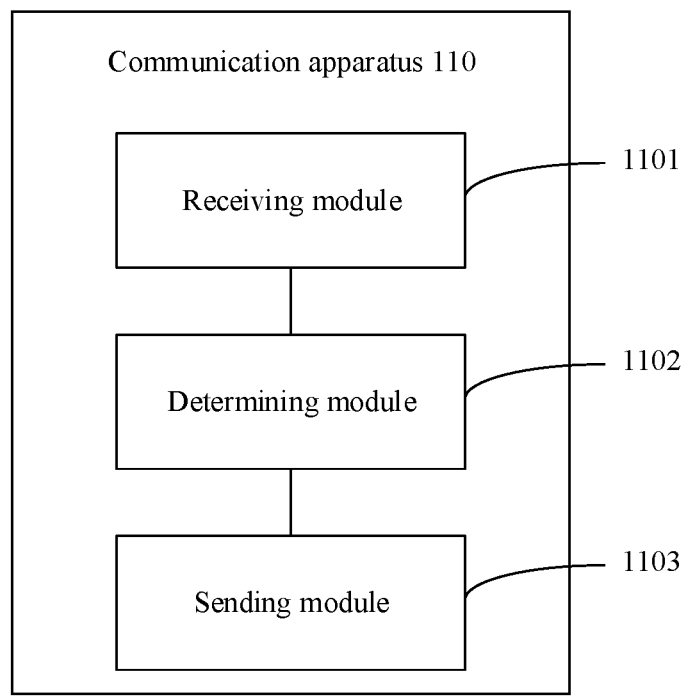
FIG. 12 is a schematic diagram depicting a structure of a communication apparatus, according to an embodiment of this application.

Optionally, as shown in FIG. 12, the communication apparatus 110 further includes a sending module 1103. The sending module 1103 is configured to send second indication information to the second terminal device or the network device, where the second indication information is used to indicate a type of sidelink control information supported by the first terminal device.

Optionally, the type of the sidelink control information includes a two-level structure of sidelink control information, or the type of the sidelink control information includes a first level of sidelink control information of the two-level structure of the sidelink control information.

Optionally, the sidelink control information includes resource indication information, and the resource indication information is used to indicate a resource of data and/or a resource of a second level of sidelink control information of the two-level structure of the sidelink control information.

All related content of the operations in the foregoing method embodiments may be cited in function description of the corresponding functional modules. Details are not described herein.

In this embodiment, the communication apparatus 110 is presented in a form of functional modules obtained through division in an integration manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 110 may be in the form shown in FIG. 2.

For example, the processor 201 in FIG. 2 may invoke computer-executable instructions stored in the memory 203, so that the communication apparatus 110 performs the sidelink control information sending method in the foregoing method embodiments.

For example, functions/implementation processes of the receiving module 1101, the determining module 1102, and the sending module 1103 in FIG. 12 may be implemented by using the processor 201 in FIG. 2 by invoking the computer-executable instructions stored in the memory 203. Alternatively, a function/an implementation process of the determining module 1102 in FIG. 12 may be implemented by using the processor 201 in FIG. 2 by invoking the computer-executable instructions stored in the memory 203, and functions/implementation processes of the receiving module 1101 and the sending module 1103 in FIG. 12 may be implemented by using the communication interface 204 in FIG. 2.

Because the communication apparatus 110 provided in this embodiment can perform the foregoing sidelink control information sending method, for technical effects that can be achieved by the communication apparatus 110, refer to the foregoing method embodiments. Details are not described herein again.

Figure 13:
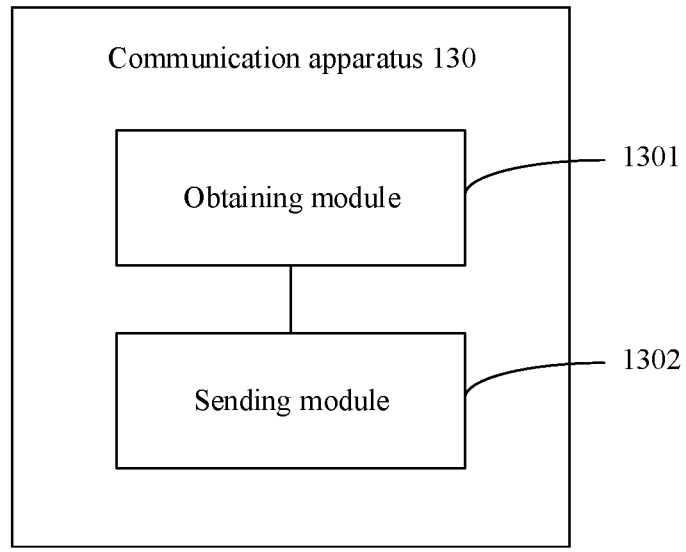
FIG. 13 is a schematic diagram depicting a structure of a communication apparatus, according to an embodiment of this application.

For example, when the functional modules are obtained through division in an integration manner, FIG. 13 is a schematic diagram depicting a structure of a communication apparatus 130. The communication apparatus 130 may be a terminal device, or a functional module or a chip that is in the terminal device and that can perform the method performed by the terminal device in this application, or the like. The communication apparatus 130 includes an obtaining module 1301 and a sending module 1302. The obtaining module 1301 is configured to obtain first information, where the first information is used to indicate a type of sidelink control information sent by the second terminal device to a first terminal device. The sending module 1302 is configured to send the sidelink control information to the first terminal device based on the first information.

Optionally, the first information includes indication information indicating the type of the sidelink control information. The sending module 1302 is further configured to send the first information to the first terminal device.

Optionally, the first information is radio resource control signaling, media access control signaling, a master information block, a system information block, or previous sidelink control information.

Optionally, the first information includes characteristic information, and the characteristic information includes at least one of the following information: radio network temporary identifier information, search space information, and control resource information.

Optionally, the sending module 1302 is further configured to send first indication information to the first terminal device, where the first indication information is used to indicate a type of sidelink control information to-be-detected by the first terminal device.

Figure 14:
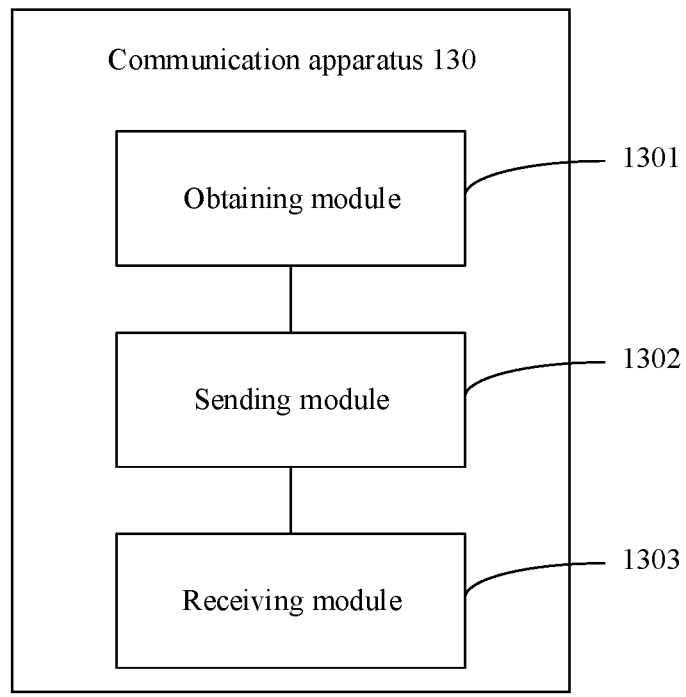
FIG. 14 is a schematic diagram depicting a structure of a communication apparatus, according to an embodiment of this application.

Optionally, as shown in FIG. 14, the communication apparatus 130 further includes a receiving module 1303. The receiving module 1303 is configured to receive second indication information sent by the first terminal device, where the second indication information is used to indicate a type of sidelink control information supported by the first terminal device.

Optionally, the obtaining module 1301 is specifically configured to receive the first information sent by the network device, or the obtaining module 1301 is specifically configured to determine the type of the sidelink control information, or the obtaining module 1301 is further specifically configured to obtain the first information based on the type of the sidelink control information.

Optionally, the type of the sidelink control information includes a two-level structure of sidelink control information, or the type of the sidelink control information includes a first level of sidelink control information of the two-level structure of the sidelink control information.

Optionally, the sidelink control information includes resource indication information, and the resource indication information is used to indicate a resource of data and/or a resource of a second level of sidelink control information of the two-level structure of the sidelink control information.

All related content of the operations in the foregoing method embodiments may be cited in function description of the corresponding functional modules. Details are not described herein again.

In this embodiment, the terminal device 130 is presented in a form of functional modules obtained through division in an integration manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the terminal device 130 may be the form shown in FIG. 2.

For example, the processor 201 in FIG. 2 may invoke computer-executable instructions stored in the memory 203, so that the terminal device 130 performs the sidelink control information sending method in the foregoing method embodiments.

For example, functions/implementation processes of the obtaining module 1301, the sending module 1302, and the receiving module 1303 in FIG. 14 may be implemented by using the processor 201 in FIG. 2 by invoking the computer-executable instructions stored in the memory 203. Alternatively, a function/an implementation process of the obtaining module 1301 in FIG. 14 may be implemented by using the processor 201 in FIG. 2 by invoking the computer-executable instructions stored in the memory 203, and functions/implementation processes of the sending module 1302 and the receiving module 1303 in FIG. 14 may be implemented by using the communication interface 204 in FIG. 2.

Because the communication apparatus 130 provided in this embodiment can perform the foregoing sidelink control information sending method, for technical effects that can be achieved by the communication apparatus 130, refer to the foregoing method embodiments. Details are not described herein again.

Figure 15:
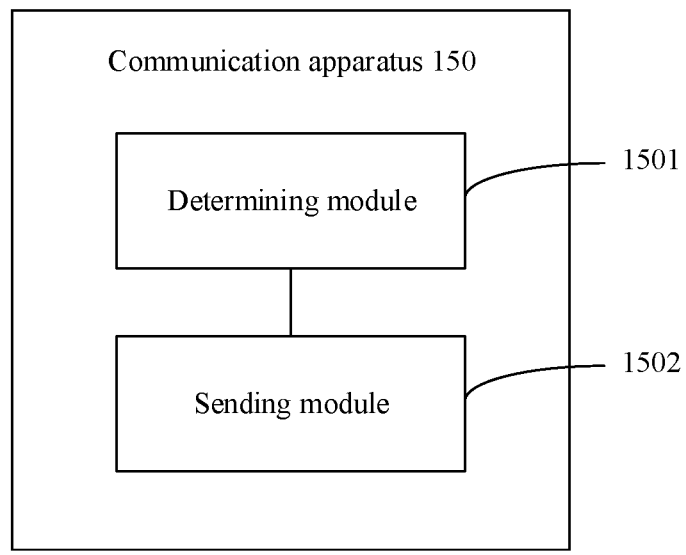
FIG. 15 is a schematic diagram depicting a structure of a communication apparatus, according to an embodiment of this application.

For example, when the functional modules are obtained through division in an integration manner, FIG. 15 is a schematic diagram depicting a structure of a communication apparatus 150. The communication apparatus 150 may be a network device or a functional module or a chip that is in the network device and that can perform the method performed by the network device in this application, or the like. The communication apparatus 150 includes a determining module 1501 and a sending module 1502. The determining module 1501 is configured to determine first information, where the first information is used to indicate a type of sidelink control information that is sent by a second terminal device to a first terminal device. The sending module 1502 is configured to send the first information to the second terminal device or to the first terminal device and the second terminal device.

Optionally, the first information includes indication information indicating the type of the sidelink control information that is sent by the second terminal device to the first terminal device.

Optionally, the first information is radio resource control signaling, media access control signaling, a master information block, a system information block, or downlink control information.

Optionally, the sending module 1502 is further configured to send first indication information to the first terminal device, where the first indication information is used to indicate a type of sidelink control information to-be-detected by the first terminal device.

Figure 16:
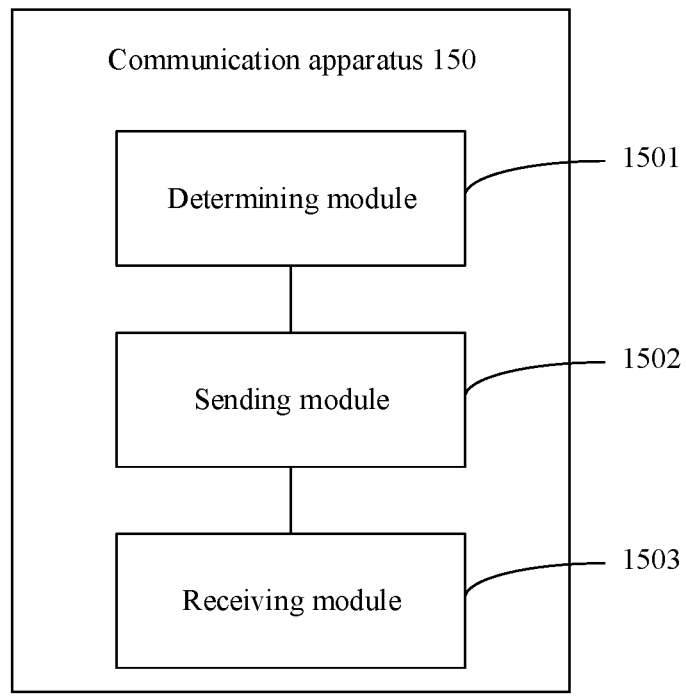
FIG. 16 is a schematic diagram depicting a structure of a communication apparatus, according to an embodiment of this application.

Optionally, as shown in FIG. 16, the communication apparatus 150 further includes a receiving module 1503. The receiving module 1503 is configured to receive second indication information sent by the first terminal device, where the second indication information is used to indicate a type of sidelink control information supported by the first terminal device.

Optionally, the type of the sidelink control information includes a two-level structure of sidelink control information, or the type of the sidelink control information includes a first level of sidelink control information of the two-level structure of the sidelink control information.

All related content of the operations in the foregoing method embodiments may be cited in function description of the corresponding functional modules. Details are not described herein again.

In this embodiment, the communication apparatus 150 is presented in a form of functional modules obtained through division in an integration manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 150 may be in the form shown in FIG. 2.

For example, the processor 201 in FIG. 2 may invoke computer-executable instructions stored in the memory 203, so that the communication apparatus 150 performs the sidelink control information sending method in the foregoing method embodiments.

For example, functions/implementation processes of the determining module 1601, the sending module 1602, and the receiving module 1603 in FIG. 16 may be implemented by using the processor 201 in FIG. 2 by invoking the computer-executable instructions stored in the memory 203. Alternatively, a function/implementation process of the determining module 1601 in FIG. 16 may be implemented by using the processor 201 in FIG. 2 by invoking the computer-executable instructions stored in the memory 203, and functions/implementation processes of the sending module 1602 and the receiving module 1603 in FIG. 16 may be implemented by using the communication interface 204 in FIG. 2.

Because the communication apparatus 150 provided in this embodiment can perform the foregoing sidelink control information sending method, for technical effects that can be achieved by the communication apparatus 150, refer to the foregoing method embodiments. Details are not described herein again.

Figure 17:
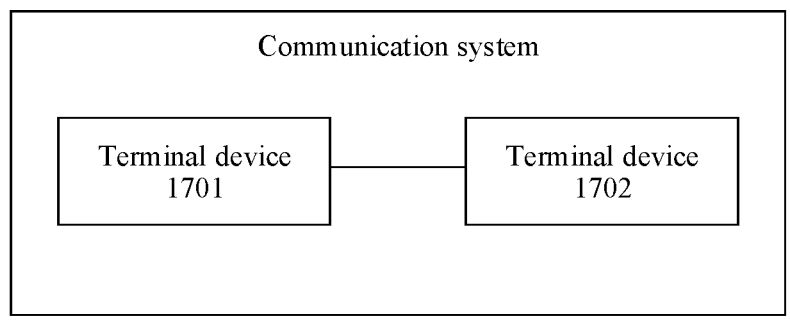
FIG. 17 is a schematic diagram depicting a structure of a communication system, according to an embodiment of this application.

FIG. 17 is a schematic composition diagram of a communication system. As shown in FIG. 17, the communication system may include a terminal device 1701 and a terminal device 1702. It should be noted that FIG. 17 is merely an example accompanying drawing, and network elements included in the communication system shown in FIG. 17 and a quantity of the network elements are not limited in this embodiment of this application.

The terminal device 1701 has functions of the communication apparatus 110 shown in FIG. 11, and may be configured to receive sidelink control information sent by the terminal device 1702, and determine a type of the sidelink control information based on the first information.

The terminal device 1702 has functions of the communication apparatus 130 shown in FIG. 13, and is configured to: obtain first information, where the first information is used to indicate the type of the sidelink control information that is sent by the terminal device 1702 to the terminal device 1701, and send the sidelink control information to the terminal device 1701 based on the first information.

It should be noted that all related content of the steps in the foregoing method embodiments may be cited in function descriptions of corresponding network elements of the communication system. Details are not described herein again.

According to the method shown in FIG. 17, after obtaining the first information, the terminal device 1702 may send the SCI to the terminal device 1701 based on the first information, and the terminal device 1701 may determine the type of the SCI based on the first information, and further may blindly detect only a type of SCI that the terminal device 1701 needs to detect. This reduces complexity of blindly detecting SCI by the first terminal device.

Figure 18:
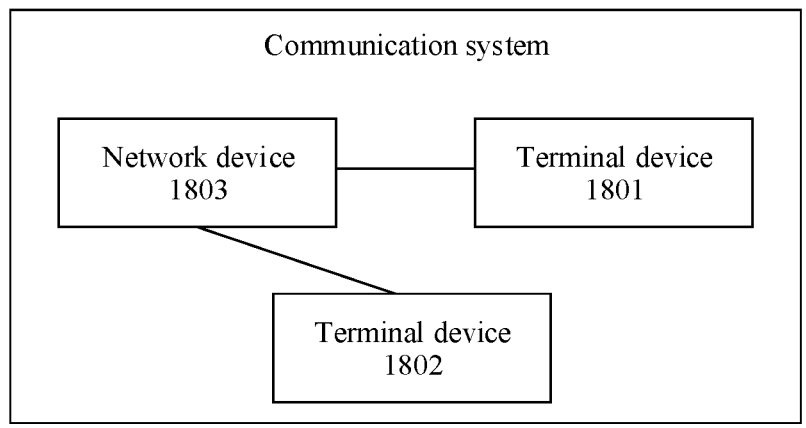
FIG. 18 is a schematic diagram depicting a structure of a communication system, according to an embodiment of this application.

FIG. 18 is a schematic composition diagram of a communication system. As shown in FIG. 18, the communication system may include a terminal device 1801, a terminal device 1802, and a network device 1803. It should be noted that FIG. 18 is merely an example accompanying drawing, and network elements included in the communication system shown in FIG. 18 and a quantity of the network elements are not limited in this embodiment of this application.

The terminal device 1801 has functions of the communication apparatus 110 shown in FIG. 11, and may be configured to receive sidelink control information sent by the terminal device 1802, and determine a type of the sidelink control information based on the first information.

The terminal device 1802 has functions of the communication apparatus 130 shown in FIG. 13, and is configured to: obtain first information, where the first information is used to indicate the type of the sidelink control information that is sent by the terminal device 1802 to the terminal device 1801, and send the sidelink control information to the terminal device 1801 based on the first information.

The network device 1803 has functions of the communication apparatus 150 shown in FIG. 15, and is configured to: determine first information, where the first information is used to indicate a type of sidelink control information that is sent by the terminal device 1802 to the terminal device 1801, and send the first information to the terminal device 1802, or to the terminal device 1801 and the terminal device 1802.

It should be noted that all related content of the steps in the foregoing method embodiments may be cited in function descriptions of corresponding network elements of the communication system. Details are not described herein again.

According to the method shown in FIG. 18, after determining the first information, the network device 1803 may send the first information to the terminal device 1802 or to the terminal device 1801 and the terminal device 1802. The terminal device 1802 may send the SCI to the terminal device 1801 based on the first information. The terminal device 1801 may determine the type of the SCI based on the first information, and further may blindly detect only a type of SCI that the terminal device needs to detect. This reduces complexity of blindly detecting SCI by the first terminal device.

It should be noted that in the foregoing embodiments of this application, names of messages between network elements, names of parameters in the messages, or the like are merely examples, and the messages and the parameters may have other names during specific implementation. This is not specifically limited in the embodiments of this application.

It should be noted that, in descriptions of this application, terms such as "first" and "second" are merely used for differentiation and description, and should not be understood as an indication or implication of relative importance or an indication or implication of an order. In this application, for indication information that has different numbers such as "first indication information", the numbers are merely used for convenience of description, and different sequence numbers do not indicate specific technical meanings. For example, first indication information and second indication information can be understood as one or any of a plurality of indication information.

It can be understood that in the embodiments of this application, the terminal device and/or the network device may perform some or all operations in the embodiments of this application. These operations are merely examples. In the embodiments of this application, other operations or variations of the operations may further be performed. In addition, the operations may be performed in different orders presented in the embodiments of this application, and not all operations in the embodiments of this application need to be performed.

All or some of the foregoing embodiments may be implemented by using software, hardware, firmware, or any combination thereof in the foregoing embodiments. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, it is clearly that various modifications and combinations may be made to this application without departing from the spirit and scope of this application. Correspondingly, the specification and accompanying drawings are merely example descriptions of this application defined by the appended claims, and are considered as any or all of modifications, variations, combinations, or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A sidelink control information sending method, the method comprising:
    receiving, by a first terminal device, first information from a network device or a second terminal device, wherein the first information comprises indication information indicating a type of sidelink control information;
    determining, by the first terminal device, the type of the sidelink control information based on the received first information;
    performing, by the first terminal device, blind detection using the determined type of the sidelink control information; and
    based on performing the blind detection using the determined type of the sidelink control information, receiving, by the first terminal device, the sidelink control information from the second terminal device via a physical sidelink control channel (PSCCH);
    wherein the first information is received by the first terminal device over a different channel than the PSCCH.

2. The method according to claim 1, wherein the first information is received via at least one of:
    radio resource control signaling,
    media access control signaling,
    a master information block, or
    a system information block.

3. The method according to claim 1, wherein the first information comprises characteristic information; and
    wherein the determination of the type of the sidelink control information is based on the characteristic information and an association relationship between the characteristic information and the type of the sidelink control information.

4. The method according to claim 3, wherein the characteristic information comprises at least one of the following information:
    radio network temporary identifier information,
    search space information, or
    transmission resource information.

5. A sidelink control information sending method, the method comprising:
    obtaining, by a second terminal device, first information, wherein the first information indicates a type of sidelink control information to be sent by the second terminal device to a first terminal device via a physical sidelink control channel (PSCCH);
    sending, by the second terminal device, the first information to the first terminal device over a different channel than the PSCCH to enable the first terminal device to perform blind detection for receiving the sidelink control information using the type of the sidelink control information indicated by the first information; and
    sending, by the second terminal device, the sidelink control information via the PSCCH to the first terminal device.

6. The method according to claim 5, wherein the first information comprises characteristic information, wherein the characteristic information comprises at least one of the following information:
    radio network temporary identifier information,
    search space information, or
    control resource information.

7. The method according to claim 5, further comprising:
    receiving, by the second terminal device, second indication information from the first terminal device, wherein the second indication information indicates that the type of the sidelink control information is supported by the first terminal device.

8. A first terminal device, comprising:
    a communication interface configured to receive first information from a network device or a second terminal device, wherein the first information comprises indication information indicating a type of sidelink control information; and
    a processor configured to:
        determine the type of the sidelink control information based on the received first information; and
        perform blind detection using the determined type of the sidelink control information; and
    wherein the communication interface is further configured to, based on performing the blind detection using the determined type of the sidelink control information, receive the sidelink control information from the second terminal device via a physical sidelink control channel (PSCCH):
    wherein the communication interface is configured to receive the first information over a different channel than the PSCCH.

9. The first terminal device according to claim 8, wherein the communication interface is configured to receive the first information via at least one of:
    radio resource control signaling,
    media access control signaling,
    a master information block, or
    a system information block.

10. The first terminal device according to claim 8, wherein the first information comprises characteristic information; and
    wherein the processor is configured to determine the type of the sidelink control information based on the characteristic information and an association relationship between the characteristic information and the type of the sidelink control information.

11. The first terminal device according to claim 10, wherein the characteristic information comprises at least one of the following information:
radio network temporary identifier information,
search space information, or
transmission resource information.

12. A second terminal device, comprising:
a processor configured to obtain first information, wherein the first information indicates a type of sidelink control information to be sent by the second terminal device to a first terminal device via a physical sidelink control channel (PSCCH); and
a communication interface configured to:
send the first information to the first terminal device over a different channel than the PSCCH to enable the first terminal device to perform blind detection for receiving the sidelink control information using the type of the sidelink control information indicated by the first information; and
send the sidelink control information to the first terminal device via the PSCCH.

13. The second terminal device according to claim 12, wherein the first information comprises characteristic information, wherein the characteristic information comprises at least one of the following information:
radio network temporary identifier information,
search space information, or
control resource information.

14. The second terminal device according to claim 12, wherein the communication interface is further configured to receive second indication information from the first terminal device, wherein the second indication information indicates that the type of the sidelink control information is supported by the first terminal device.

15. A non-transitory computer-readable storage medium, comprising a computer program, wherein when the computer program is run on at least one storage node, the at least one storage node performs the sidelink control information sending method according to claim 1.

16. A non-transitory computer-readable storage medium, comprising a computer program, wherein when the computer program is run on at least one storage node, the at least one storage node performs the sidelink control information sending method according to claim 5.

17. The method according to claim 1, further comprising:
sending, by the first terminal device, second indication information to the second terminal device, wherein the second indication information indicates that the type of the sidelink control information is supported by the first terminal device.

18. The first terminal device according to claim 8, wherein the communication interface is configured to send second indication information to the second terminal device, wherein the second indication information indicates that the type of the sidelink control information is supported by the first terminal device.

* * * * *

UNITED STATES PATENT AND TRADEMARK OFFICE
CERTIFICATE OF CORRECTION

PATENT NO. : 12,328,725 B2
APPLICATION NO. : 17/511217
DATED : June 10, 2025
INVENTOR(S) : Zhang et al.

Page 1 of 1

It is certified that error appears in the above-identified patent and that said Letters Patent is hereby corrected as shown below:

In the Claims

Claim 8: Column 40, Line 48: "channel (PSCCH):" should read as -- channel (PSCCH); --.

Signed and Sealed this
Fourth Day of November, 2025

John A. Squires
*Director of the United States Patent and Trademark Office*